United States Patent [19]

Regenold et al.

[11] Patent Number: 5,838,931

[45] Date of Patent: Nov. 17, 1998

[54] METHOD AND APPARATUS FOR ENABLING A PROCESSOR TO ACCESS AN EXTERNAL COMPONENT THROUGH A PRIVATE BUS OR A SHARED BUS

[75] Inventors: David Regenold, Mesa, Ariz.; Parviz Hatami, Santa Clara, Calif.

[73] Assignee: Intel Corporation, Santa Clara, Calif.

[21] Appl. No.: 854,158

[22] Filed: May 9, 1997

Related U.S. Application Data

[63] Continuation of Ser. No. 353,172, Dec. 8, 1994, abandoned.

[51] Int. Cl.⁶ .................................................. G06F 11/30
[52] U.S. Cl. ........................................... 395/308; 395/309
[58] Field of Search .................................. 395/308, 476, 395/309; 370/402

[56] References Cited

U.S. PATENT DOCUMENTS

| | | | |
|---|---|---|---|
| 4,953,074 | 8/1990 | Kametani et al. | 364/132 |
| 5,168,568 | 12/1992 | Thayer et al. | 395/305 |
| 5,185,599 | 2/1993 | Doornink et al. | 345/200 |
| 5,226,153 | 7/1993 | DeAngelis et al. | 395/183.21 |
| 5,293,586 | 3/1994 | Yamazaki et al. | 428/116 |
| 5,327,538 | 7/1994 | Hamaguchi et al. | 395/287 |
| 5,398,211 | 3/1995 | Willenz et al. | 365/230.05 |

OTHER PUBLICATIONS

Structured Computer Organization, Andrew S. Tanenbaum, 1990 pp. 11–13.

*Primary Examiner*—Ayaz R. Sheikh
*Assistant Examiner*—Paul R. Myers
*Attorney, Agent, or Firm*—Blakely, Sokoloff, Taylor & Zafman

[57] ABSTRACT

A method and an apparatus for enabling a processor to access an external component through either a private bus or a shared bus. One embodiment of the present invention is an external memory access apparatus which includes an external memory access unit. This external memory access unit couples to the processor through an external memory access unit bus. In addition, the external memory access unit couples to external memory through a private bus. The external memory access unit also couples to the external memory through a shared bus, which also couples an external component to the external memory.

18 Claims, 17 Drawing Sheets

P-BUS STATE MACHINE STATE DIAGRAM

S-BUS STATE MACHINE STATE DIAGRAM ated with a # METHOD AND APPARATUS FOR ENABLING A PROCESSOR TO ACCESS AN EXTERNAL COMPONENT THROUGH A PRIVATE BUS OR A SHARED BUS This is a continuation of application Ser. No. 08/353,172 filed Dec. 8, 1994 now abandoned.

BACKGROUND OF THE INVENTION

1. Field of the Invention

The present invention relates to the field of computer systems, and particularly to a method and an apparatus for enabling a processor to access an external component through either a private bus or a shared bus.

2. Art Background

In recent years, an increasing number of processors (e.g., digital signal processors that use a RISC like architecture) have increased their instructions execution speed by simplifying or eliminating their microcodes. For instance, one way that this simplification/elimination has increased the processors' instruction execution speeds is by reducing the instruction decoding and execution time. In fact, presently, a number of processors, that use a RISC like architecture, can decode and execute an instruction word in just one clock cycle.

To take advantage of this reduced instruction decode and execution time, and to increase further the processor instruction execution speed, a method for reducing the data access time (i.e., the time needed to provide a processor requested data word to the processor) is needed. In addition, a method for reducing the data access time has been long-sought in digital signal processing applications which require the digital signal processor to receive a maximum amount of multi-media data in real time.

FIG. 1 presents one prior art data accessing method. As shown in this figure, this prior art approach reduces the data access time by placing an internal data memory bank 100 in processor 102. Arithmetic logic unit (i.e., ALU) 104 can then access a data word in a few clock cycles by supplying addresses of particular memory cells (storing the data word) to the internal data memory bank. In turn, the internal data memory bank decodes these addresses, and provides the requested data word (at the supplied addresses) to the ALU by driving the appropriate bit lines and sense amplifiers. However, since the space on a processor die is limited and since memory cell arrays consume a relatively large amount of die space, only a limited amount of data can be stored internally, which thereby limits the amount of data that the ALU can access under this prior art data accessing method. Consequently, this prior art data accessing method does not sufficiently reduce the data access time because it only enables the ALU to access a limited amount of data in this manner. In addition, this prior art internal data accessing method does not provide the shortest data access time because at times ALU 104 has to terminate its data access to allow other components of the computer to access the data memory.

Thus, as prior art internal data storage methods do not sufficiently reduce the data access time, several prior art external data accessing methods have been developed. FIG. 2 presents one example of a prior art external data accessing method. As shown in this figure, this prior art approach stores data in the surplus memory of the program memory. However, this prior art data accessing method also does not sufficiently reduce the data access time, because it uses one instruction bus 110 to relay both instructions and data to processor 112. More specifically, this prior art approach requires three entire clock cycles to access a data word, where (1) during the first clock cycle, processor 112 receives an instruction word, (2) during the second clock cycle, processor 112 decodes the instruction, and (3) during the third clock cycle processor 112 generates a data address and reads the data. In addition, this prior art approach does not sufficiently reduce the data access time because often processor 112 has to terminate its data access to allow other components of the computer to use the instruction bus to access the data memory. For example, occasionally the processor has to terminate its data access so as to allow an external system memory to store additional information in the data memory.

FIG. 3 presents a second prior art method for accessing external data. This prior art method uses separate instruction bus 120 and data bus 122 to respectively couple a processor 124 with separate instruction memory 126 and data memory 128. However, for several reasons, this prior art external data accessing method also does not provide the shortest data access time. First, this prior art external data accessing method does not provide the shortest data access time as it requires the processor (1) to make a separate data request for each individual data word to data memory cell array 128, and (2) to wait idly by until the data memory cell array supplies the requested data. Second, the access time is adversely affected because, in order to communicate to data memory 128, processor 124 has to drive a data bus which is highly capacitive due to the large number of components that are coupled to it.

Third, the prior art external memory accessing method of FIG. 3 does not sufficiently reduce the access time because at times the processor has to terminate its data access to allow other components of the computer to use the data bus to access the data memory. For example, the processor has to occasionally terminate its data access so as to allow an external system memory to access the data memory. This prior art data accessing method increases the size of the data memory cell array, in order to reduce the data access time by reducing the number of times that processor 124 has to terminate its data access to allow an external system memory to store additional data in data memory bank 128. However, this prior art solution is not an optimal solution because increasing the size of the data memory cell array increases the cost of the computer system. In addition, this prior art solution cannot be used when due to design constraints and space limitations, the size of the data memory cell array cannot be enlarged.

SUMMARY OF THE INVENTION

The present invention provides a method and an apparatus for enabling a processor to access an external component through either a private bus or a shared bus. One embodiment of the present invention is an external memory access apparatus which includes an external memory access unit. This external memory access unit couples to the processor through an external memory access unit bus. In addition, the external memory access unit couples to external memory through a private bus. The external memory access unit also couples to the external memory through a shared bus, which also couples an external component to the external memory.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

In the following description, numerous details are set forth in order to provide a thorough understanding of the present invention. However it will be understood by one of ordinary skill in the art that these specific details are not required in order to practice the invention. For example, although for purposes of explanation the following description pertains to a method and an apparatus to access external data memory, it will be understood by one of ordinary skill in the art that the present invention can be used by a processor to access any external memory (e.g., an instruction memory) or any other external component. In other instances, well-known electrical structures and circuits are shown in block diagram form in order not to obscure the present invention with unnecessary detail.

1. External Memory Access Apparatus

Figure 4:
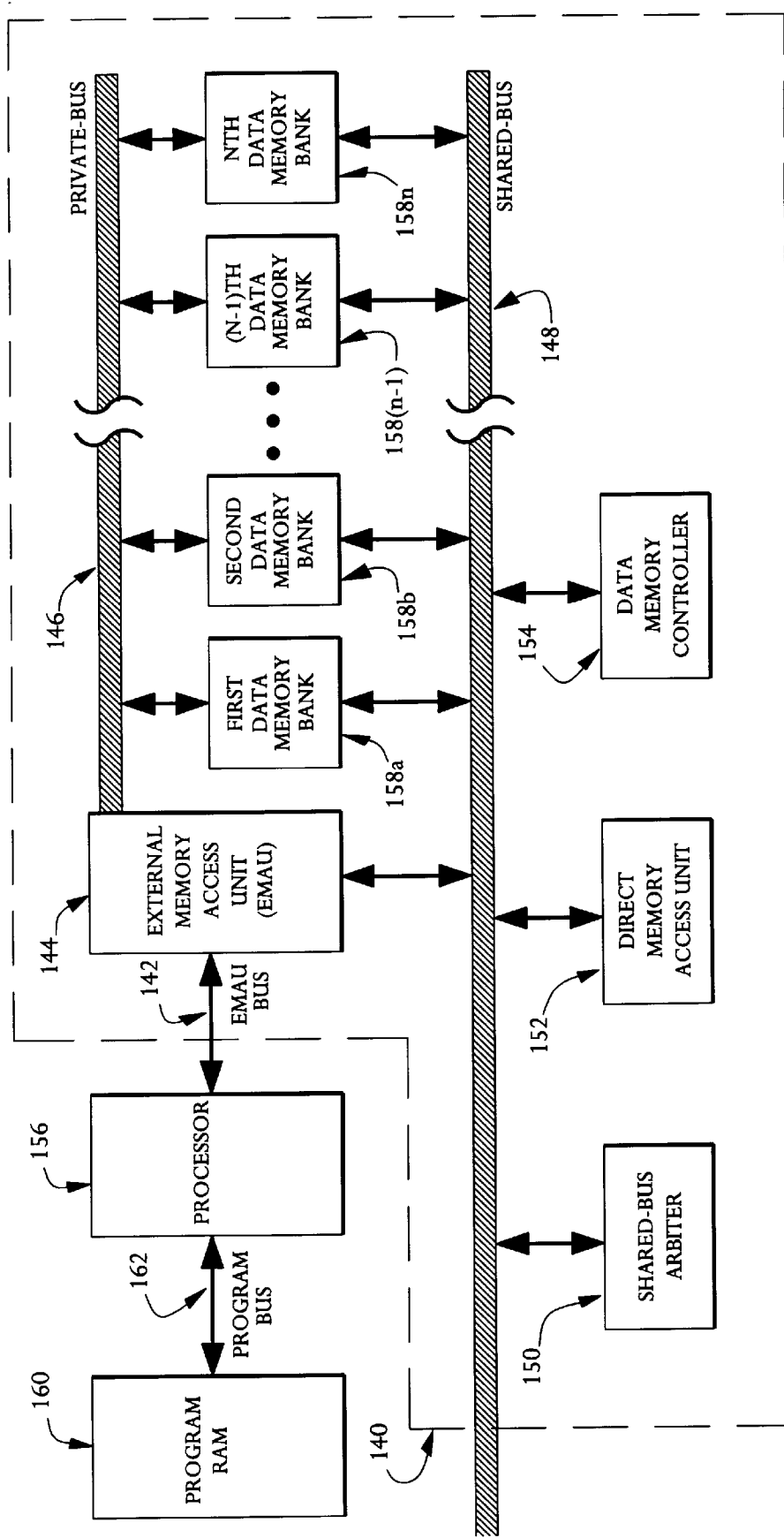
FIG. 4 presents a computer system architecture which incorporates one embodiment of the external memory access apparatus of the present invention.

The present invention provides a method and an apparatus for enabling a processor to access an external component through either a private bus or a shared bus. FIG. 4 presents a computer system architecture that incorporates one embodiment of the external component accessing apparatus of the present invention. In the embodiment of the present invention that is set forth in FIG. 4, the external component accessing apparatus is an external memory accessing apparatus for enabling processor 156 to access N data memory banks 158. However, it is to be understood that the external component accessing apparatus of the present invention can enable the processor to access any number of alternative external memory banks (e.g., N instruction memory banks) or any number of alternative external components.

As shown in FIG. 4, external memory accessing apparatus 140 includes external memory accessing unit bus 142, external memory accessing unit (EMAU) 144, private bus 146, shared bus 148, shared bus arbiter 150, direct memory access unit 152, data memory bank controller 154, and N data memory banks 158. Processor 156 uses external memory access apparatus 140 to minimize its data access time. More specifically, processor 156 is an ordinary processor with limited internal data storage capacity and with limited addressing capability for accessing data. In one embodiment of the present invention, processor 156 is a digital signal processor (DSP) with a RISC like architecture, which allows the DSP to decode and execute an instruction word in just one clock cycle. Consequently, in order to take advantage of this reduced instruction decode and execution time, and to increase further the instruction execution speed of the DSP, DSP 156 uses external memory access apparatus 140 to minimize its data access time. In addition, program instructions are stored externally in program RAM 160, while data words are stored externally in data memory banks 158. Processor 156 then uses program bus 162 to access program RAM 160, while using external memory access apparatus 140 to access N data memory banks 158.

Processor 156 also uses EMAU bus 142, EMAU 144, and shared bus 148 to access numerous external components that are coupled to shared bus 148. Some examples of these external components coupled to the shared bus are an external processor, an external system memory, or an external serial port communicating information to/from other external components not coupled to the shared bus from/to external components coupled to the shared bus. In addition, in the embodiment of the present invention set forth in FIG. 4, processor 156 communicates to shared bus arbiter 150, data memory controller 154, and direct memory access unit (DMA) 152, through EMAU bus 142, EMAU 144, and shared bus 148. Shared bus arbiter 150 allocates control of the shared bus among a number of bus masters (e.g., EMAU 144 and DMA 152), by determining whether another bus master is accessing the shared bus, and if so by then determining whether that particular accessing bus master has a higher priority status than a bus master requesting access to the shared bus.

Numerous well known bus arbiters can be used as shared bus arbiter 150. For example, one embodiment of shared bus arbiter 150 is the system arbitration logic unit used in computer system architectures that use a PCI bus. Some of these bus arbiters are coupled to each bus master through an individual request line and an individual grant line. Other bus arbiters couple to all the bus masters through a common request line and a common grant line, by time multiplexing each bus master's access time to each of these lines. Yet other arbiters also use a common request line and a common grant line to couple to all the bus masters, but (rather than using time multiplexing techniques) use decoders in the arbitrators and the bus masters to determine which bus master has made a request on the request line and which bus master has been granted a shared bus access on the grant line.

Irrespective of the way shared bus arbiter 150 couples to the bus masters through the request and grant lines, for one embodiment of the present invention, the arbiter operates in the following manner. In order to gain access to the shared bus, a bus master forces the signal on its request line to a first logical state (e.g., a "1" logic level). When arbiter 150 decides to grant access to the shared bus to the requesting bus master, the arbiter forces the signal on the grant line to a second logic state (e.g., a "1") for that bus master. When the arbiter later wants to terminate a particular access to the shared bus, the arbiter forces the signal on the grant line of the accessing bus master to a third logic state (e.g., a "0"), which in turn causes the accessing bus master to terminate its access to the shared bus and to force the signal on its request line to a fourth logic state (e.g., a "0") in the next clock cycle.

Consequently, before initiating a communication through the shared bus, processor 156 initiates a communication with shared bus arbiter 150 in order to obtain permission to drive the shared bus. More specifically, to gain access to the shared bus, processor 156 requests the EMAU to initiate an external access through the shared bus. EMAU 144 then forces the signal on its request line to the first logical state, and awaits until the arbiter forces the signal on its grant line to the second logical state (which signifies that the arbiter has granted access to the shared bus to the EMAU). The EMU's access to the shared bus can be terminated by the arbiter, if the arbiter forces the signal on the grant line of the EMAU to the third logical state, which in turn causes the EMAU to terminate its access to the shared bus and to force the signal on its request line to the fourth logical state in the next clock cycle. As mentioned below, however, the processor can program the EMAU to refuse to terminate its access to the shared bus (i.e., can program the EMAU to lock the shared bus), by refusing to force the signal on its request line to the fourth logical state in response to the arbiter forcing the signal on the grant line to the third logical state.

Processor 156 also communicates through EMAU bus 142, EMAU 144, and shared bus 148 to data memory bank controller 154. Through activating a particular number of control lines (not shown in FIG. 4) that couple data memory bank controller 154 to N data banks 158, the data memory bank controller allocates the data memory banks to a particular bus (i.e., causes the data memory banks to receive information from either the shared bus or the private bus). The bus masters access data memory bank controller 154 through the shared bus in order to request controller 154 to allocate a particular data memory bank to a particular bus. If the data memory bank controller decides to allow a particular bus master to access a particular data bank, it transmits control signals through the control lines that couple it to the data banks. The data banks then decode these control signals in order to determine whether they are going to be accessed and if so whether they should receive information from the shared bus or the private bus. After informing the requested data bank that it will be accessed through either the shared or private bus, the data bank memory controller signals its permission to the bus master on the shared bus. Upon receiving permission to access the particular data bank, the requesting bus master initiates a data access to the requested data bank through either the shared bus or the private bus.

For the embodiment of the present invention that is shown in FIG. 4, EMAU 144 is the only bus master that is allowed to access the data memory bank through either the private bus or the shared bus. In other words, the only bus master that can access a particular data memory bank through the private bus is EMAU 144. This embodiment of the present invention only allows the EMAU to access the data banks through the private bus, in order to reduce the data access time of processor 156 by preventing interruptions in the processor's data access that are due to the other components accessing a particular data bank. More specifically, the processor's data access time Is minimized because processor 156 does not have to terminate its data access to allow other components of the computer system to access the data banks. Rather, processor 156 can access a particular data bank through the private bus, while allowing another component to access another data bank through the shared bus. In addition, this embodiment of the present invention only allows the EMAU to access the data banks through the private bus in order to reduce the data access time of processor 156 by preventing the private bus from being heavily loaded.

For the embodiment of the present invention set forth in FIG. 4, processor 156 also uses EMAU bus 142, EMAU 144, and shared bus 148 to communicate to direct memory access unit (DMA) 152. Direct memory access unit 152 couples a number of external components (e.g., an external system memory, which is not shown in FIG. 4) to the data banks through shared bus 148. In turn, these external components can access a particular data bank through this shared bus coupling when EMAU 144 is not accessing it through private bus 146. In addition, processor 156 communicates to DMA 152 in order to program the DMA to cause external components to access a data bank that the processor wants them to access. For example, when the processor finishes accessing a data bank, it may wish that the contents of that data bank be examined by an external component. Consequently, it accesses the direct memory access unit (through the external memory access unit and the shared bus) and programs this unit to provide the contents of this data bank to the external component.

As mentioned before, in order to minimize its data access time, processor 156 uses EMAU bus 142, EMAU 144, and either private bus 146 or shared bus 148 to access N data memory banks 158. In other words, the external memory access apparatus of the present invention allows the processor to have a short data access time. For example, when processor 156 accesses a data memory bank 158 through private bus 146, the external memory access apparatus 140 enables the processor to access X locations in the data memory in X+Y clock cycles when a write operation is undertaken and X+Y+Z clock cycles when a read operation is undertaken, where (1) X represents the number of locations accessed in the data memory, (2) Y represents the number of clock cycles needed to program the EMAU, and (3) Z represents the number of clock cycles needed to prefetch data for the read operation. For the embodiment of the present invention set forth in FIG. 4, programming clock cycles Y equals two, and prefetching clock cycles Z equals two. In addition, when processor 156 uses shared bus 148 to access a particular data memory bank, external memory access apparatus 140 allows the processor to access Y location in the data memory in X+Y+W clock cycles when a write operation is undertaken and X+Y+Z+W clock cycles when a read operation is undertaken, where W represents the number of clock cycles that the EMAU awaits until the arbiter grants it access to the shared bus.

As further discussed below, when processor 156 wishes to initiate an external access through either the private bus or the shared bus, the processor first programs the EMAU during an initial program phase. For instance, during the initial program phase, processor 156 informs the EMAU of an initial address of an external component for the EMAU to access through either the shared or private bus. During the initial program phase, processor 156 also informs the EMAU whether it requires the EMAU to initiate a block external access operation or a single external access operation. If processor 156 requests a block external access operation, the processor also informs the EMAU of the size of the block, the step size, and the particular block mode accessing method (i.e., incremental or decremental accessing method). Furthermore, processor 156 also informs the EMAU whether after initiating an access through the shared bus, the EMAU should refuse to release its access in response to the arbiter removing its grants signal (i.e., whether the EMAU should lock the shared bus). If the external access, that processor 156 requests EMAU 144 to initiate, is an external data access, the programmed information also informs the EMAU whether it should access the data banks through the private or the shared bus. After the EMAU is programmed, the processor then initiates a communication between the processor and the external component through the EMAU, by providing an external read or write command (e.g., a read or write command directed to one of the external data registers of EMAU 144).

2. External Memory Access Unit Bus

Figure 1:
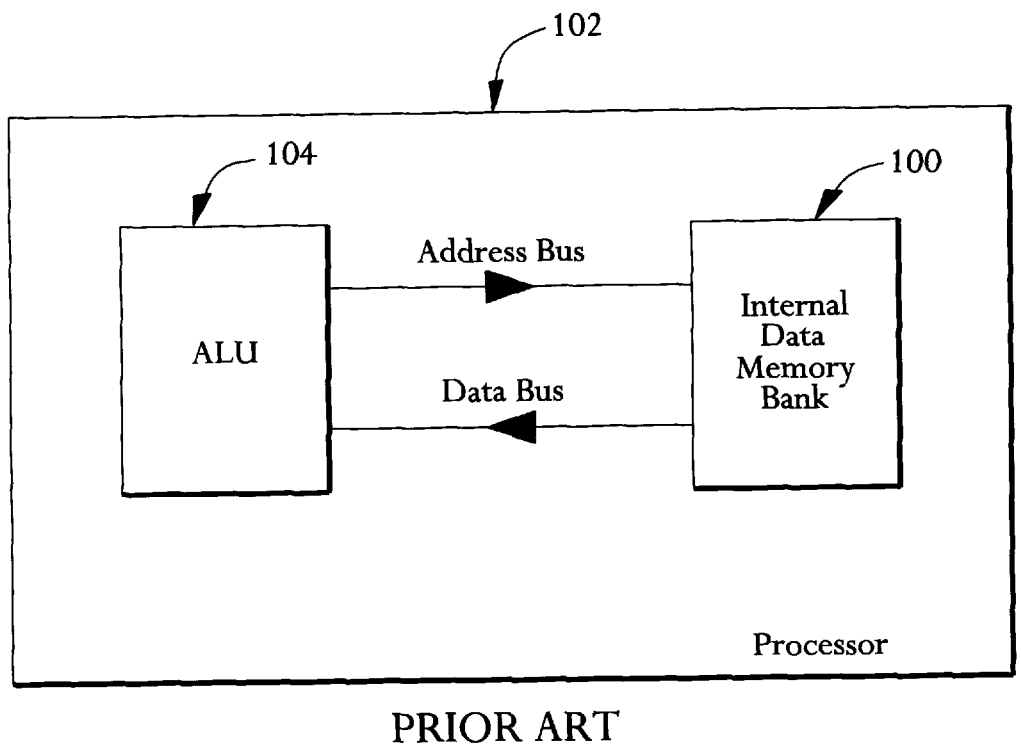
FIG. 1 presents one prior art data accessing method that reduces the data access time by internally storing the data.
Figure 2:
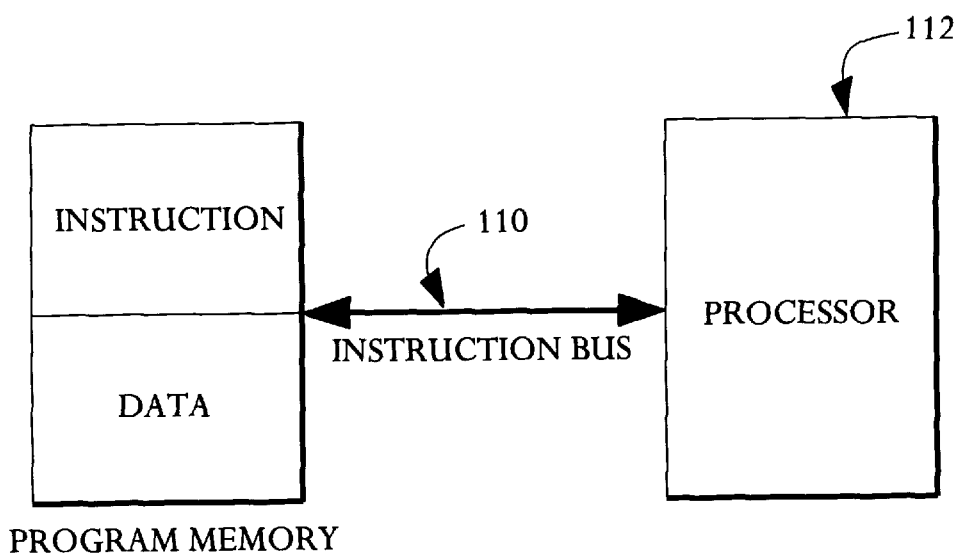
FIG. 2 presents one prior art external data accessing method that stores the data in the surplus memory of the program memory.
Figure 3:
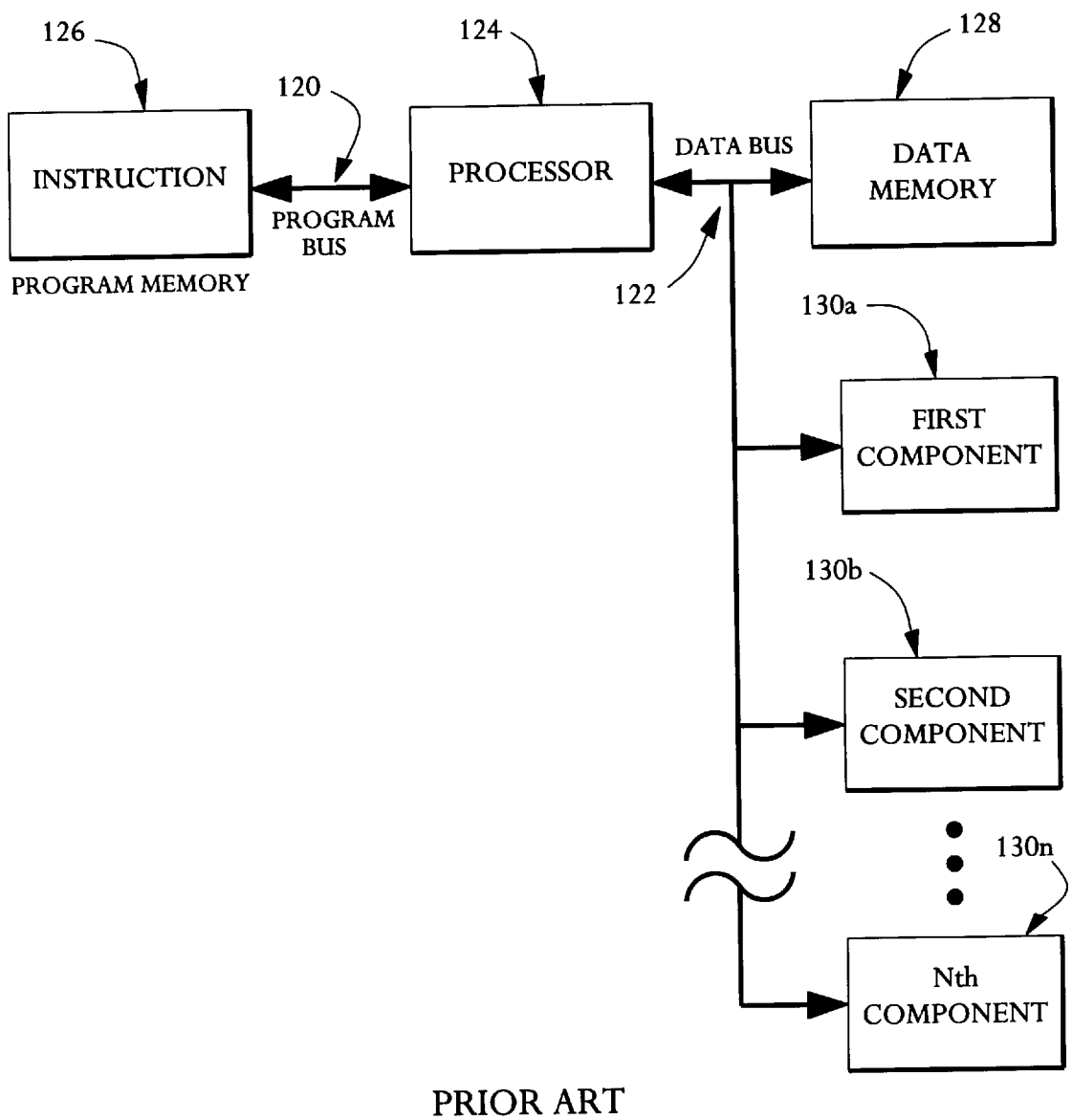
FIG. 3 presents another prior art external data accessing method which stores the data in an external data memory.
Figure 5:
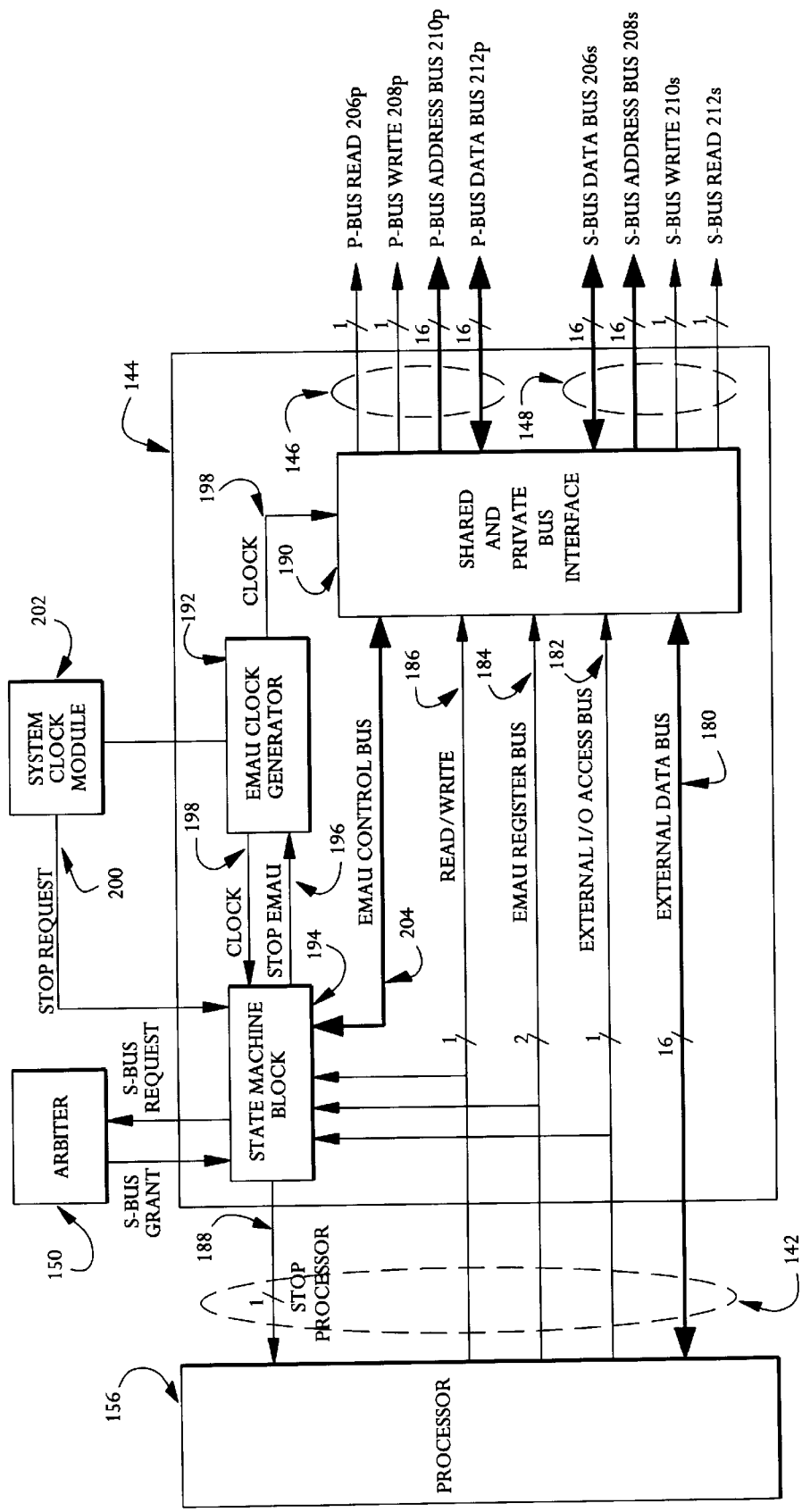
FIG. 5 presents one embodiment of an external memory access unit bus, an external memory access unit, a private bus, and a shared bus used in the external memory access apparatus of FIG. 4.

For one embodiment of the present invention, FIG. 5 presents a more detailed view of EMAU bus 142, EMAU 144, private bus 146, and shared bus 148 of FIG. 1. As shown in this figure, the EMAU bus includes external data bus lines 180, external input/output access bus Line 182, EMAU register bus lines 184, read/write bus line 186, and stop processor bus line 188.

For the embodiment of the present invention shown in FIG. 5, external data bus lines 180 are 16-bit lines used to transmit 16-bit data words between processor 156 and EMAU 144. In addition, external input/output access bus line 182 is a 1-bit line, which processor 156 uses to supply an external input/output access signal to the external memory access unit. This external input/output access signal in turn informs the external memory access unit that the processor wishes to initiate an external input/output access, and thereby causes the external memory access unit to examine the other signals that the processor transmits over the EMAU bus.

EMAU register bus 184 is a 2-bit line bus, which the processor uses in order to communicate to particular registers in the EMAU. In other words, processor 156 uses EMAU register bus 184 to direct its communications with specific EMAU registers. The EMAU bus also includes read/write bus line 186 which the processor uses to inform the EMAU that its external access involves a read operation (i.e., an input operation) or a write operation (i.e., an output operation).

Finally, the EMAU bus includes a stop processor bus line 188, which the EMAU uses to halt the operations of processor 156. For example, for the embodiments of processor 156 that do not have a wait state machine, the EMAU uses stop processor line 188 to send a stop processor clock signal to clock gating circuitry in the processor in order to stop the operation of the processor. On the other hand, for the embodiments of processor 156 that do have a wait state machine, EMAU 144 sends a wait signal to the wait state machine in order to cause the wait state machine to force processor into an idle state. The EMAU sends the stop processor clock signal or the wait signal to the processor either (1) when clock module 202 sends a stop request signal to the EMAU, in order to power down the processor and the EMAU, or (2) when, during an initial prefetch phase of the read operation, the EMAU has to stop the processor for two clock cycles.

Although for purposes of explanation FIG. 5 sets forth particular bit lines numbers for EMAU bus 142, it should be understood that in alternative embodiments of the present invention the EMAU bus has different widths. For example, although for purposes of explanation FIG. 5 presents a 16-bit line external data bus transmitting 16-bit data words, it should be understood that for alternative embodiments of the present invention external data bus 180 can have alternative widths or can transmit data words having different bit sizes. Consequently, one embodiment of EMAU 144 receives 8-bit data words and uses sign extension techniques to relay 16-bit data words to processor 156.

3. Private and Shared Buses

For one embodiment of the present invention, FIG. 5 also presents a more detailed view of the private bus and shared bus of the present invention. As shown in this figure, each of these buses includes a read bus line 206 and a write bus line 208. These read and write bus lines are used in the private and shared buses in order to inform an external component, which the processor is accessing through the EMAU, that the processor wishes to perform a read or a write operation. In addition, the private bus and the shared bus both have 16-bit line address buses 210, which they use to transmit the address of the externally accessed component. Finally, both these bases have 16-bit line bi-directional data buses 212, which are used to relay data signals between processor 156 and the externally accessed component. Although for purposes of explanation FIG. 5 presents specific widths for the private and of the shared bus, it should be understood that for alternative embodiments of the present invention these buses can have alternative widths.

4. External Memory Access Unit

FIG. 5 also presents one embodiment of the external memory access unit of the present invention. As shown in this figure, the external memory access unit includes EMAU clock generator 192, shared and private bus interface 190, and state machine block 194. The EMAU clock generator receives clock signals from system clock module 202, strengthens these clock signals, and provides (along lines 198) these strengthened signals to state machine block 194 and to shared and private bus interface 190.

As shown in FIG. 5, state machine block 194 receives the shared bus grant and shared bus request signals from arbiter 150, in order to determine when processor 156 can access the shared bus through the external memory access unit. Also, as mentioned before, state machine block 194 receives a stop request signal (on stop request line 200) from system clock module 202, in order to cause the processor and the EMAU to power down. Furthermore, as further described below, state machine block 194 receives the signals on external I/O access bus 182, EMAU register bus 184, read/write bus 186, EMAU control bus 204, and the shared bus grant line, in order to determine when an external access can be initiated. Upon determining that an external access can be initiated, state machine block 194 then transmits (on EMAU control bus 204) enable signals to shared and private bus interface 190, in order to cause it to initiate an external data access in response to an external read or write command from the processor. In other words, state machine block 194 monitors the signals that processor 156 transmits to shared and private bus interface 190, so that it can generate enable signals which control the operation of shared and private bus interface 190 (and thereby control the operation of EMAU 144).

Shared and private bus interface 190 houses a number of registers that processor 156 programs during the initial program phase. Processor 156 controls the programming of the registers of shared and private bus interface 190 through control signals transmitted along external I/O access 182, EMAU register 184, and read/write bus 186. In addition, through external data bus 180, processor 156 transmits programming signals to particular registers of shared and private bus interface 190. Furthermore, shared and private bus interface 190 uses external data bus 180 to relay information to/from processor 156 from/to external components (e.g., external data memory banks 158). Finally, shared and private bus interface 190 uses EMAU control bus 204 to transmit/receive control signals to/from state machine block 194.

5. Shared and Private Bus Interface

Figure 6:
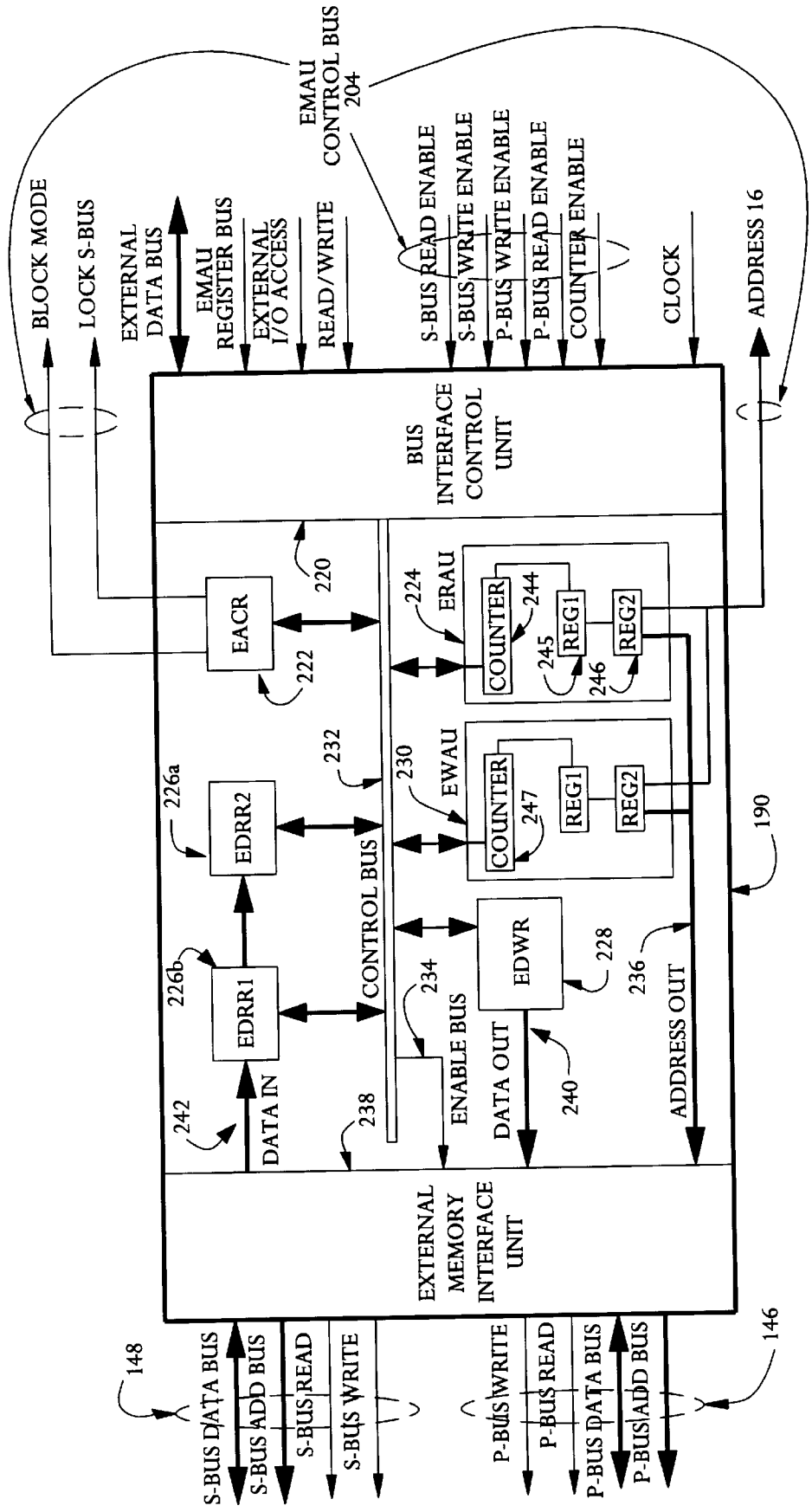
FIG. 6 presents one embodiment of a private and shared bus interface used in the external memory access unit of FIG. 5.

FIG. 6 presents a more detailed view of one embodiment of shared and private bus interface 190 of EMAU 144 of FIG. 5. As shown in this figure, shared and private bus interface 190 includes bus interface control unit 220, external access control register (EACR) 222, external read address unit (ERAU) 224, external write address unit (EWAU) 230, external data read registers (EDRR) 226, and external data write register (EDWR) 228. Control unit 220 couples to processor 156 through the external data bus 180, external I/O access bus 182, EMAU register bus 184, and read/write bus 186. Control unit 220 is a decoder that controls the communications between processor 156 and the external registers of shared and private bus interface 190. For instance, control unit 220 prevents any signals on the EMAU bus 142 from reaching the registers of shared and private bus interface 190 until the processor indicates the initiation of an external access on external I/O access bus line 182. Upon detecting an external access signal on external I/O access bus 182, control unit 220 then determines which register the processor wishes to communicate with by examining the signals on the EMAU register bus 184. As mentioned before, for one embodiment of the present invention, the EMAU register bus has two bit lines. Consequently, for this embodiment of the present invention, Table 1 sets forth the decoding logic used by control unit 220 to determine the external register (of bus interface 190) that processor 156 is communicating with.

TABLE 1

| Bit value of the second bit line of EMAU register bus | Bit value of the first bit line of EMAU register bus | Bus interface's external register being accessed |
| --- | --- | --- |
| 0 | 0 | External access control register 222 |
| 0 | 1 | External read address unit 224 |
| 1 | 0 | External write address unit 230 |
| 1 | 1 | External data registers 226a/228 |

Once control unit 220 determines which external register of shared and private bus interface processor 156 wishes to communicate with, control unit 220 enables the requested external register while disabling the rest of the external registers of bus interface 190. Control unit 220 then directs the signals on the external data bus 180 and the read/write bus 186 to the requested register, in order to initiate communication between the requested register and the processor.

As further shown in FIG. 6, control unit 220 receives clock signals on clock bus 198. Control unit 220 uses the clock signals for its operation and transmits (via bus interface control bus 232) the clock signals to the external registers of the shared and private bus interface. As further shown in FIG. 6, control unit 220 also receives signals from state machine block 194 along EMAU control bus 204. As shown in this figure, the control lines that state machine block 194 uses to communicate with shared and private bus interface 190 include a counter enable line, which the control unit uses to transmit a counter enable signal to external address units 224 or 230 after processor 156 has initiated a communication with external address units 224 or 230.

The control lines that state machine block 194 uses to communicate with shared and private bus interface 190 also include shared and private bus read and write enable lines. The signals on these lines are transmitted by the control unit to external memory interface unit 238 along bus interface control bus 232 and enable bus 234. Based on these shared and private read and write enable signals, external memory interface unit 238 determines whether the shared bus or the private bus is being requested for a external access and if so whether the external access involves a read or write operation.

Consequently, if external memory interface unit determines that the private bus is being requested for an external read, external memory interface unit 238 tri-states all the bus lines on the shared bus, deactivates the private bus write bus line, and activates the private bus address bus, data bus, and read bus line. On the other hand, if the processor requests the private bus for an external write, external memory interface unit 238 tri-states all the bus lines on the shared bus, deactivates the private bus read bus line, and activates the private bus address bus, data bus, and write bus line. However, if processor 156 has requested an external read along the shared bus, external memory interface unit 238 deactivates all the bus lines on the private bus, deactivates the shared bus write bus line, and activates the shared bus address bus, data bus, and read bus line. Finally, if the processor requests an external write along the shared bus, external memory interface unit 238 deactivates all the bus lines on the private bus, deactivates the shared bus read bus line, and activates the shared bus data bus, address bus, and write bus line.

a. External Access Control Register

As mentioned before, in order to initiate an external data access, processor 156 initially programs EMAU 144 during an initial programming phase. For the embodiment of shared and private bus interface 190 which is shown in FIG. 6, the programming operation is as follows. During the first cycle of the two-cycle initial programming phase, processor 156 programs external access control register 222. Processor 156 initiates this programming of external access register 222 by first indicating an external input or output access on external I/O access line 182. Processor 156 also transmits a "00" on the EMAU register bus, in order to inform control unit 220 that it wishes to communicate with external access control register 222. Processor 156 then programs in EACR 222 a first control word by asserting a write on read/write bus 186 and transmitting the first control word to shared and private bus interface 190 through external data bus 180. Table 2 sets forth one example of the first control word.

TABLE 2

FIRST CONTROL WORD

| Bit Number | Bit Function |
| --- | --- |
| 1 | Loop size bit |
| 2 | Loop size bit |
| 3 | Loop size bit |
| 4 | Loop size bit |
| 5 | Loop size bit |
| 6 | Loop size bit |
| 7 | Loop size bit |
| 8 | Loop size bit |
| 9 | Increment bit |
| 10 | Decrement bit |
| 11 | Step size bit |
| 12 | Lock Shared bus bit |
| 13 | Reserved |
| 14 | Reserved |
| 15 | Reserved |
| 16 | Reserved |

The ninth bits of the first control word indicate whether the processor plans to initiate a single access or block access operation. If a block access operation is desired, these ninth and tenth bits also indicate whether the processor wishes an incremental or decremental block mode operation. Table 3 sets forth one manner through which the ninth and tenth bits are used to indicate the mode of access operation.

TABLE 3

| Bit Value of decrement (tenth) bit | Bit Value of increment (ninth) bit | Type of Access Operation |
| --- | --- | --- |
| 0 | 0 | Single access operation |
| 0 | 1 | Auto-increment block access operation |
| 1 | 0 | Auto-decrement block access operation |
| 1 | 1 | single access operation |

EACR 222 then informs either address counter unit 244 or 247 (in either the ERAU 224 or EWAU 230) of the type of access operation processor 156 has requested. If processor 156 requests either type of block mode access operation (i.e., the auto-increment or auto-decrement block mode access operation), the first 8-bits (i.e., the loop size bits) of the first control word determine the size of the accessed block (i.e., the loop size). These first 8-bits allow the processor to select any block size from 1 to 256. External access control register 222 provides this block size to either address counter unit 244 or 247.

Processor 156 also uses the eleventh bit of the first control word to program the mode of accessing. More specifically, if processor 156 has requested a block mode access, the eleventh bit informs the EMAU that the step size of the increment or decrement will be either one or two. This ability of the present invention to allow the processor to program the step size of two is advantageous in DSP applications, because it allows the processor to access either only real or only imaginary data, when real and imaginary data components are stored in the data memory as adjacent data words. External access control register 222 in turn informs either address counter 224 or 247 of this step size.

The twelfth bit of the first control word determines whether the EMAU will lock the shared bus. More specifically, if this shared bus lock bit is set (i.e., has a value of "1") and if sixteenth bit of a second control word (which, as mentioned below, processor 156 programs into either ERAU 224 or EWAU 230) indicates that the EMAU should initiate a data transfer through the shared bus, the EMAU will lock the shared bus after its request has been granted by arbiter 150. Consequently, if the EMAU accesses the shared bus after processor 156 has requested it to lock the shared bus, the EMAU will not bring its shared bus request signal low (lowering the shared bus request signal would allow the arbiter to grant access to the shared bus to another bus master) even after the arbiter removes its shared bus grant signal. After locking the shared bus, the EMAU does not unlock the shared bus automatically after the processor finishes its access through the shared bus. More specifically, in order for the EMAU to release its lock on the shared bus, processor 156 has to re-program the external access control register (i.e., processor 156 has to write another control word in the EACR 222, whose 12-bit is clear (has a value of "0")). This ability of the processor to retain its lock on the shared bus is useful during a read modify-write operation. Finally, when this shared bus lock bit is not set (i.e., has a value of "0"), the shared bus is not locked and the EMAU relinquishes its access to the shared bus (i.e., lowers its request signal) after the arbiter lowers the signal on its grant line.

Processor 156 also can read the first control word stored in external access control register 222, by (1) asserting an active signal on external I/O access line 182, (2) transmitting a "00" signal on EMAU register bus 184 to indicate to bus interface control unit 220 that it wishes to communicate with external access control unit 222, and (3) asserting a read operation on read/write bus line 186. In response to these signals, EACR 222 then places the programmed first control word on bus interface control bus 232, which then transfers this information to processor 156 through control unit 220 and external data bus 180.

b. External Address Unit

In the last clock cycle of the two-clock cycle initial programming phase, processor 156 programs one of the external address units. During this clock cycle, processor 156 maintains the active signal on external input/output access line 182 and transmits either a "01" or a "10" signal on the EMAU register bus to indicate to bus interface control unit 220 that it wishes to communicate with one of the external address units 224 or 230. Processor 156 programs external read address unit 224 when it wishes to initiate an external read operation, while it programs external write address unit 230 when it wishes to initiate an external write operation. In order not to obscure the description of the present invention with unnecessary detail, the following discussion pertains to the programming of the external read address unit. However, it is to be understood that the following discussion is equally applicable to the programming of the external write address unit.

After selecting ERAU 224, processor 156 then transmits a second 16-bit control word to the external address unit through external data bus 180 and causes external read address unit 224 to record this signal by asserting a write operation on read/write bus line 186. The sixteenth bit of the second control word is used to indicate whether the EMAU should initiate a read operation through the shared bus or the private bus. This sixteenth bit is stored in second address register 246 in ERAU 224. The ERAU supplies this sixteenth bit to state machine 194, which later generates enable signals that select the bus through which the EMAU should initiate an external access. For the embodiment of the present invention shown in FIG. 6, a value of "1" for the sixteenth bit causes the EMAU to access an external component through the shared bus, while a value of "0" for the sixteenth bit causes the EMAU to initiate an external data access through the private bus.

Bits one through fifteen of the second control word are used by the processor to indicate an address of an external component coupled to either the shared or private bus. During an external data access, bit one through fifteen indicate (1) the address of the requested data word when the EMAU undertakes a single access operation, or (2) the initial address of a requested block of data words when the EMAU undertakes a block access operation. Bits nine through fifteen of the second control word are stored in second address register 246 of external read address unit 224. These seven bits in combination with the original lower eight bits define an external register location (e.g., a memory location in one of the N data bank 158).

The lower eight bits of the second control word are supplied to address counter unit 244 of ERAU 224. In turn, when state machine block 190 supplies an active counter enable signal to address counter unit 244, the address counter unit uses these lower eight bits and the control signals that EACR 222 supplies to it (e.g., step size, loop size, and decrement/increment mode signals) to generate up to 256 external partial addresses. In other words, if processor 156 requests a block mode access, address counter unit 244 generates up to 256 external partial addresses, by counting up or down by 1 or 2 starting from the initial eight bits that are supplied to it (i.e., bits one through eight of the second control word).

As shown in FIG. 6, address counter unit 244 also receives counter enable signal (from state machine block 194 via bus interface control unit 220 and bus interface control bus 232), which activates and deactivates the counter. The operation of external read address unit 224, during the first two clock cycles that counter unit 244 receives an active counter enable signal, will now be described. During the high phase of the first clock cycle, second address register 246 stores bits nine through sixteen of the second control word, while first address register 245 stores bits one through eight of the second control word. During the low phase of the first clock cycle, first address register 245 supplies the first eight bits of the second control word to second address register 246 which then produces a complete first external address by combining these lower eight bits with bits nine through sixteen and stores this complete first external address. In addition during this low phase, counter 244 generates a first eight bit partial address. During the high phase of the second clock cycle, counter 244 supplies the first partial address to first address register 245, and second address register 246 transmits the first external address along address output bus 236. During the low phase of the second clock cycle, address counter 244 generates a second eight bit partial address, and second address register 246 receives the first partial address from first address register 245, in order to produce a complete second external address by combining the first partial address with bits nine through sixteen of the second control word and to store this complete second external address.

It should be noted that processor 156 can also read the second control word or a current address stored in the address register of ERAU 224, by (1) asserting an active signal on external I/O access line 182, (2) transmitting a "01" signal on EMAU register bus 184 to indicate to control unit 220 that it wishes to communicate with ERAU 224, and (3) asserting a read operation on the read/write bus line 186. In response to these signals, ERAU 224 then places the contents of its second address register 246 on control bus 232, which in turn transfers this information to processor 156 through control unit 220 and external data bus 180.

c. External Data Registers

After the initial two-clock cycle programming phase, processor 156 then initiates a external input (i.e., read) or output (i.e., write) operation. Processor 156 uses external data read registers (i.e., EDRR) 226 during a read operation, and uses external data write register (i.e., EDWR) 228 during a write operation. The use of this register data accessing method reduces the data access time of processor 156.

More specifically, as mentioned before, when processor 156 accesses a data memory bank 158 through private bus 146, external memory access apparatus 140 enables the processor to access X locations in the data memory in X+Y clock cycles when a write operation is undertaken and X+Y+Z clock cycles when a read operation is undertaken, where (1) X represents the number of locations accessed in the data memory, (2) Y represents the number of clock cycles needed to program he EMAU, and (3) Z represents the number of clock cycles needed to prefetch data for the read operation. As mentioned before, for one embodiment of the present invention, programming clock cycles Y equals two and prefetching clock cycles Z equals two. On the other hand, when processor 156 uses shared bus 148 to access a particular data memory bank, external memory access apparatus 140 allows the processor to access X location in the data memory in X+Y+W clock cycles when a write operation is undertaken and X+Y+Z+W clock cycles when a read operation is undertaken, where W represents the number of clock cycles that the EMAU awaits until the arbiter grants it access to the shared bus.

The operation of shared and private bus interface 190 during a read operation will now be described with reference to FIG. 7, which shows a block read access mode along the private bus. The following description is equally applicable to a block read access along the shared bus, except that during a shared bus read operation there will exist a delay of W clock cycle, until the arbiter grants the EMAU's shared bus request.

State machine block 194 receives external I/O bus 182, EMAU register bus 184, and read/write bus 186, in order to determine when processor 156 requests an external read operation from second external data read register 226a. Upon detecting this request (which is represented by an external I/O access signal, a read signal, and EMAU register signal selecting external data registers 226a or 228), state machine block 194 activates the stop processor signal supplied to processor 156 in order to cause the processor 156 either to stop or idle for two clock cycles, which in turn allows EMAU 144 to prefetch two data words and store them in the external data registers.

More specifically, during the first clock cycle that state machine block 194 detects that processor 156 has requested an external read from second EDRR 226a, state machine block 194 activates the counter enable signal for as long as the processor accesses the external data registers 226a or 228. In addition, during the low phase of this first clock cycle, state machine block 194 (1) asserts a stop processor signal on the stop processor line 188 and maintains this signal for two clock cycles (i.e., maintains this signal until the low phase of the third clock cycle after state machine block 194 detects an external read), and (2) activates the private read enable signal bus and maintains this signal until one half clock cycles after the processor terminates its communication with EDRR 226a.

The second clock cycle is a first prefetch cycle during which ERAU 224 transmits a first external address along address out bus 236 to external memory interface unit 238. Interface unit 238 in turn transmits the first external address along private bus address bus 210p. In addition, during the second clock cycle, shared and private bus interface 190 activates the private bus read signal (on private bus read line 206p) and maintain this active signal until one clock cycle after processor terminate its communication with EDRR 226a. Finally, during the second clock cycle, first EDRR 226b begins to store the data that is retrieved from the specified first data location.

The third clock cycle is a second prefetch cycle, during which (1) ERAU 224 transmits a second external address along address out bus 236 and address bus 210p, (2) first external data read register 226b finishes storing the first data word retrieved from the first address location and begins to store the second data retrieved from the second data location, (3) second EDRR 226a stores the first data word which was stored in first EDRR 226b, (4) state machine block 194 deactivates (i.e., pulls to ground) the stop processor signal, and (5) processor 156 begins to receive the data stored in the second external data read register 226a.

Figure 7:
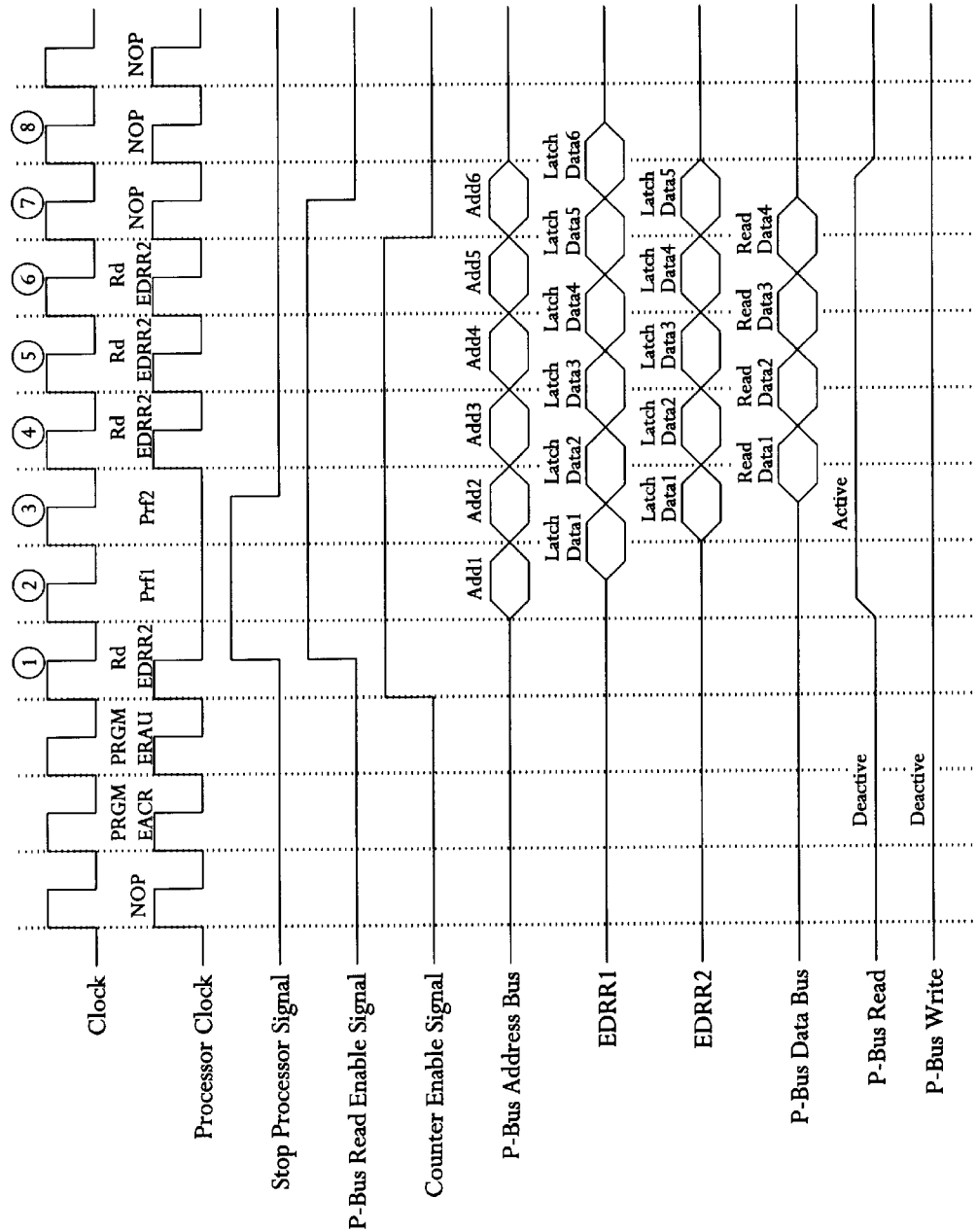
FIG. 7 present one embodiment of the timing diagram for a block read access operation of the shared and private bus interface of FIG. 6.

As shown in FIG. 7, the operation of the EMAU during the fourth, fifth, and sixth clock cycles are identical. During these three clock cycles, (1) state machine block 194 supplies active read enable and counter enable signals to shared and private bus interface 190, (2) ERAU 224 transmits a third, a fourth, and a fifth external addresses along address out bus 236 and address bus 210p, (3) first EDRR 226b finishes storing the second data word from the second address location, stores the third and fourth data words retrieved from the third and fourth data locations, and begins to store the fifth data word retrieved from the fifth data location, (4) second EDRR 226a stores the second, third, and fourth data words that were stored in the first EDRR 226b, and (5) processor 156 finishes receiving first, second, and third data words stored in second EDRR 226a, and starts receiving the fourth data word stored in the second EDRR 226a.

During the seventh clock cycle, (1) state machine block 194 deactivates the private bus read enable and counter enable signals, (2) ERAU 224 transmits a six external address along address out bus 236 and address bus 210p, (3) first EDRR 226b finishes storing the fifth data word from the fifth address location, and begins storing the sixth data word retrieved from the sixth data location, (4) second EDRR 226a stores the fifth data word that was stored in the first EDRR 226b, and (5) processor 156 finishes receiving the fourth data word stored in the second EDRR 226a. Consequently, by the end of the eighth clock cycle (after state machine block 194 detects the processor 156 is accessing external data register 226a), EMAU 144 has supplied to processor 156 four data words and has prefetched and stored two additional data words (i.e., data words five and six) in external data read registers 226.

The operation of a shared and private bus interface 190 during a single access read operation is very much similar to the above-described block read operation, except that during a single access read operation (1) private address bus only transmits three addresses (during the second, third, and fourth clock cycles), (2) first EDRR 226b only latches three data words during the second, third, fourth, and fifth clock cycles), (3) second EDRR 226a only latches two data words (during the third and fourth clock cycles), and (4) processor 156 only reads one data word along external data bus 180 (during the third and fourth clock cycles). In addition, since during a single access read operation counter 244 generates the same partial address three times, private bus address bus 210p transmits the same address three times, external data read registers 226a stores the same data word three times, and external data read registers 226b stores the same data word two times.

On the other hand, if processor 156 supplies a write signal over read/write bus line 186, while supplying an external I/O access signal and an EMAU register signal selecting external data registers 226a or 228, bus interface 190 allows processor 156 to initiate an output (i.e., write) operation through external data write register 228. More specifically, as mentioned before, if the sixteenth bit of the second control word indicates an external access through the private bus, external memory access apparatus 140 enables processor 156 to undertake an external write operation in X+Y clock cycles, where (1) x represents the number of locations accessed in the data memory, and (2) Y represents the number of clock cycles needed to program the EMAU. In addition, when the sixteenth bit of the second control word indicates an external write operation to a particular data memory bank through the shared bus, external memory access apparatus 140 allows the processor to undertake this operation in X+Y+W clock cycles, where W represents the number of clock cycles that the EMAU awaits until the arbiter grants it access to the shared bus.

Figure 8:
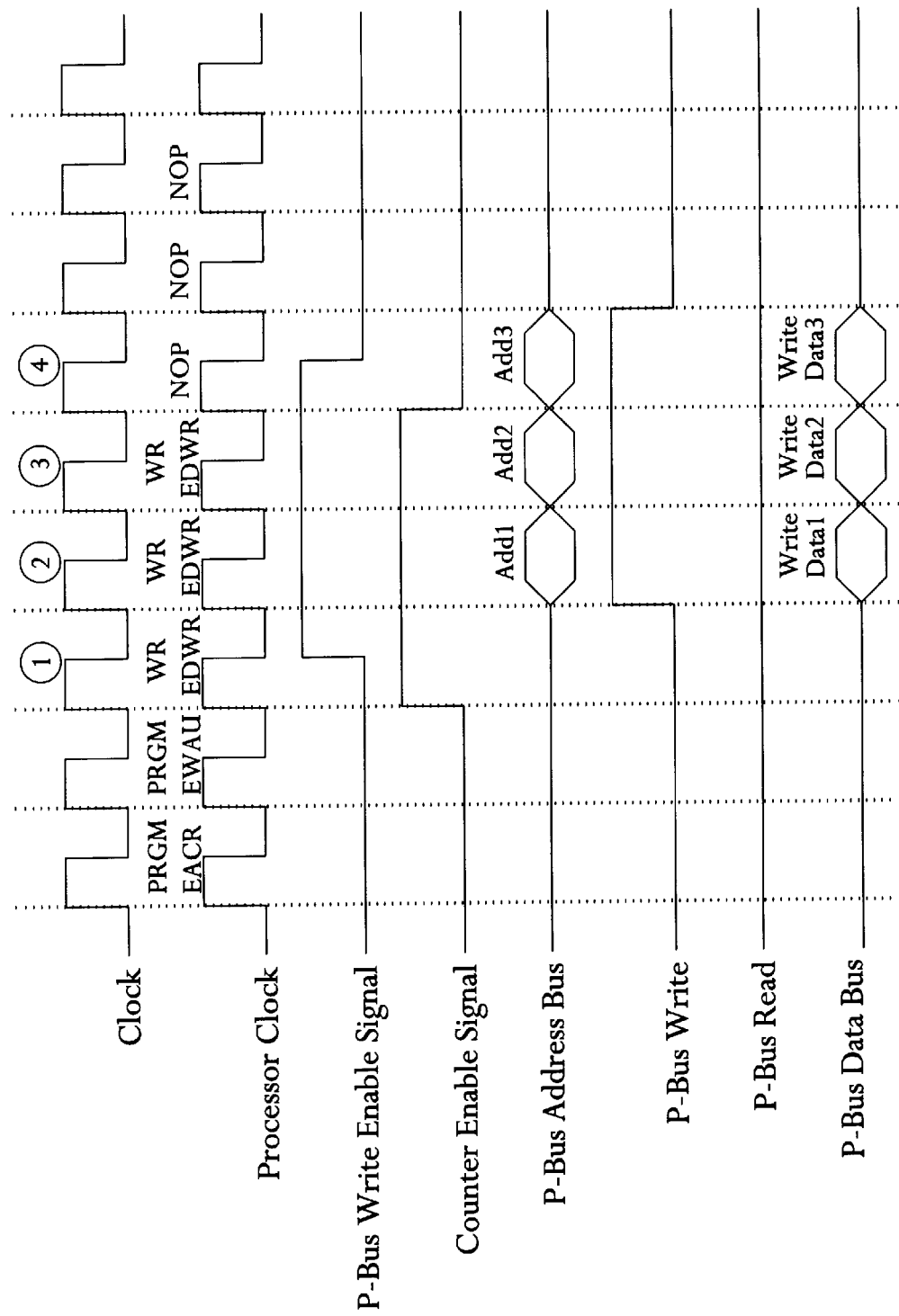
FIG. 8 presents one embodiment of the timing diagram for a block write access operation of the shared and private bus interface of FIG. 6.

The operation of a shared and private bus interface 190 during a write operation will now be described with reference to FIG. 8, which shows a block write access operation along the private bus. The following description is equally applicable to a block write access along the shared bus, except that for a shared bus write there will exist a delay of W clock cycles until the arbiter grants the EMAU's shared bus request.

State machine block 194 receives external I/O bus 182, EMAU register bus 184, and read/write bus 186, in order to determine when processor 156 requests an external write operation from external data write register 228. Upon detecting this request (which is represented by an external I/O access signal, a write signal, an EMAU register signal selecting external data registers 226a or 228), state machine block 194 activates the counter enable signal for as long as the processor accesses external data write register 228. In addition, during the low phase of the first clock cycle that state machine block 194 detects an external write, state machine block 194 activates the private bus write enable signal and maintains this active signal until one-half clock cycles after the processor terminates its communication with EDWR 228. During the second clock cycle that processor 156 accesses EDWR 228, (1) EWAU 230 transmits the first external address along address out bus 236 and private bus address bus 210p, (2) external memory interface unit 238 activates the private bus write bus 208p and maintains this active signal until one clock cycle after the processor terminates its communication with EDWR 228, (3) EDWR 228 transmits a first data word to the addressed data bank along private bus data bus 212*p*. As shown in FIG. 8, the operation of shared and private bus interface 190 during the third clock cycle is identical to its operation during the second clock cycle.

During the fourth clock cycle, (1) state machine block 194 deactivates the private bus write enable signal and the counter enable signal, (2) EWAU 230 transmits a third external address along address out bus 236 and address bus 210*p*, (3) external memory interface unit 238 maintains an active private bus write signal, and (4) EDWR 228 transmits a third data word to the addressed data location along private bus data bus 212*p*. Consequently, as set forth in FIG. 8, external memory access apparatus 140 of the present invention enables processor 156 to complete its part of a write operation in X+Y clock cycles, where X represents the number of locations accessed in the data memory (e.g., the three data locations accessed in FIG. 8) and Y represents the number of clock cycles needed to program the EMAU (e.g., the two clock cycles necessary to program EDRR and EWAU as shown in FIG. 8).

6. State Machine Block

Figure 9:
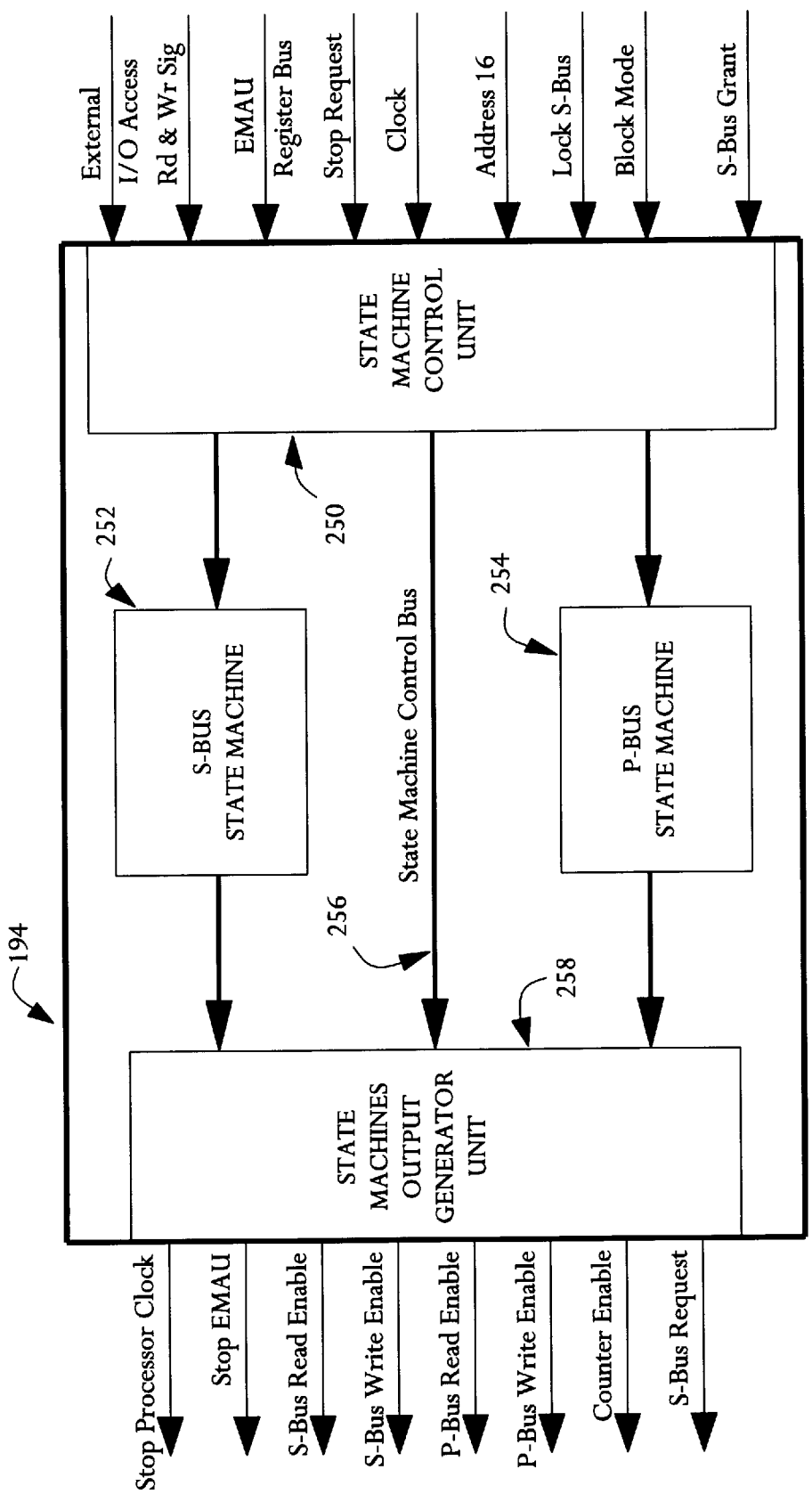
FIG. 9 presents one embodiment of a state machine block used in the external memory access unit of FIG. 5.

FIG. 9 presents one embodiment of state machine block 194. The function of this block is (1) to monitor the signals that the processor transmits to the shared and private bus interface through external I/O access bus 182, EMAU register bus 184, and read/write bus 186, (2) to monitor the grant signals that shared bus arbiter 150 supplies to it, and (3) to generate the shared and private bus enable signals, counter enable signals, and stop processor signals, which control the operation of the shared and private bus interface during an external input/output operation. In addition, as mentioned before, state machine block 194 also couples to clock module 202 to receive stop request signals, which cause the state machine to generate stop processor and EMAU clock signals.

As shown in FIG. 9, state machine block 194 includes state machine control unit 250, shared bus state machine 252, private bus state machine 254, state machine control bus 256, and state machine output generator unit 258. Control unit 250 directs the clock signals on clock bus 198 to state machines 252 and 254 and output generator unit 258. Control unit 250 is a decoder that prevents signals on the EMAU bus 142 from reaching state machines 252 and 254 and output generator unit 258, until processor 156 indicates an external input/output, access (on external I/O access bus 182). Once processor 156 initiates an external input/output access, state machine control unit; 250 then awaits for ERAU 224 or EWAU 230 to supply to it the sixteenth bit of the second control word. As mentioned before, this sixteenth bit informs state machine block 194 whether processor 156 wishes to initiate an external access through either the private bus or the shared bus. Control unit 250 then awaits processor 156 to indicate a read or write operation directed toward the external data registers 226*a* or 228 (on EMAU register bus 184). Upon receiving this indication, control unit 250 (1) enables one of the state machines 252 or 254, while disabling the other, based on the value of the second control word's sixteenth bit, and (2) enables state machine output generator unit 258.

After control unit 250 enables a particular state machine, control unit 250 directs toward this state machine the signals that appear on external I/O access bus 182, EMAU register bus 184, read/write bus 186, stop request line 200, and the block mode line of EMAU control bus 204. In addition, if control unit 250 enables shared bus state machine 252, control unit 250 not only directs towards this state machine the signals mentioned above, but also directs towards this state machine the shared bus lock signal (appearing on EMAU control bus 204) and the shared bus grant signal.

These inputs to the state machines cause the state machines to undergo various state transitions. For the embodiment of state machine block 194 that FIG. 9 sets forth, state machines 252 and 254 transition from state-to-state on the rising clock edge. In other words, each state machine examines its input signals to determine whether it needs to undergo a state transition at the rising edge of the clock signal. In addition, when a state machine is enabled, the state machine generates a three digit control code (b2, b1, and b0) relating to its current particular state, and supplies this three bit state code to state machines output generator 258. State machine output generator 258 also receives through control bus 256 signals appearing on the read/write bus 186, EMAU register bus 184, EMAU control bus 204, stop request bus 200, and clock bus 198. These signals along with the three bit state codes then drive state machine output generator 258 to produce the bus enable signals, the counter enable signals, the stop clock signals, and the shared bus request signals.

a. Private Bus State Machine

If processor 156 indicates (through the sixteenth bit of the second control word) that it wishes to initiate an external access through private bus 146 and indicates (on the EMAU register bus) that it wishes to access external data registers 226*a* or 228, state machine block control unit 250 enables private bus state machine 254, while disabling shared bus state machine 252.

Figure 10:
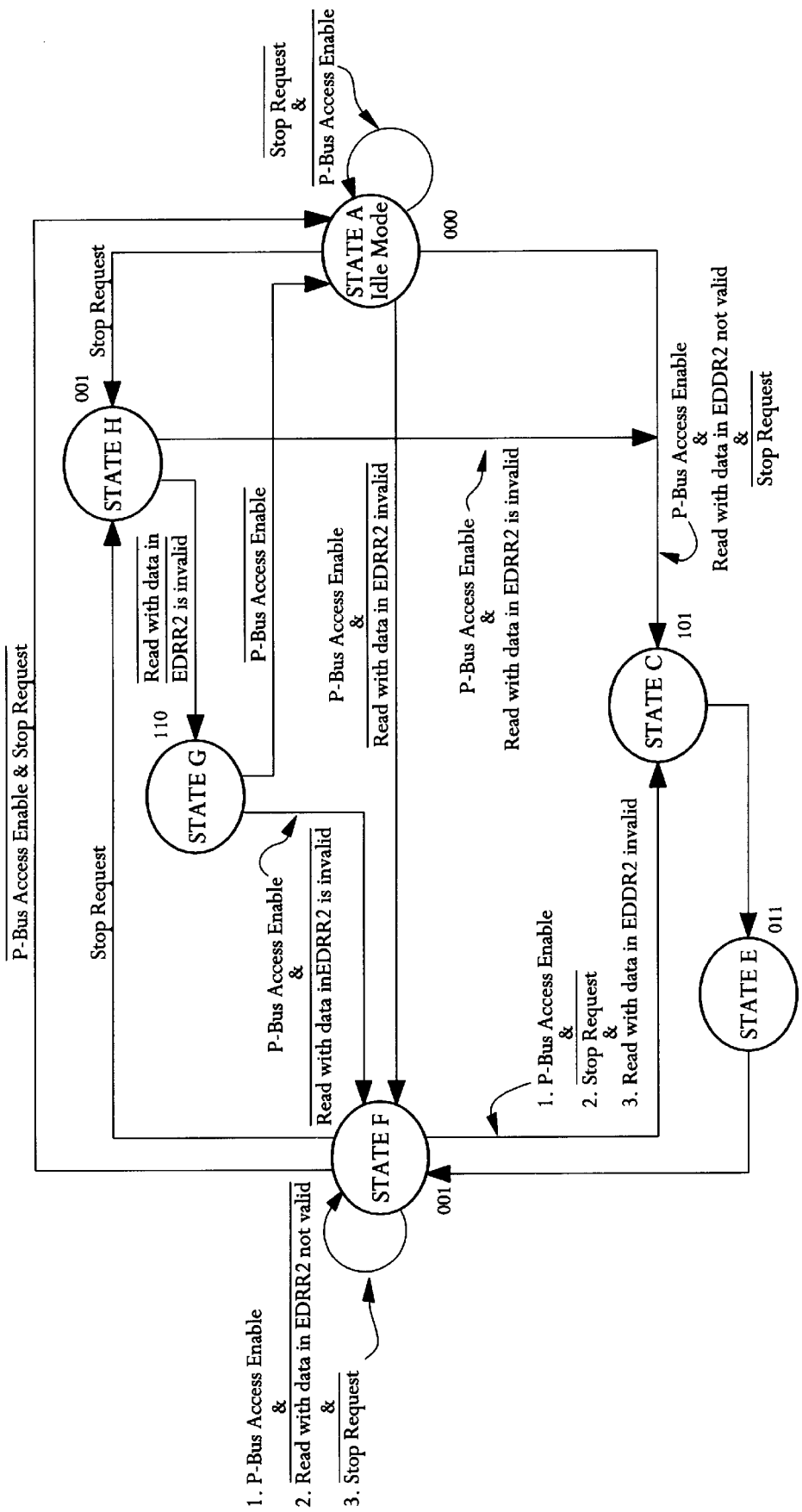
FIG. 10 presents one embodiment of a state diagram for a private bus state machine of the state machine block of FIG. 9.
Figure 11:
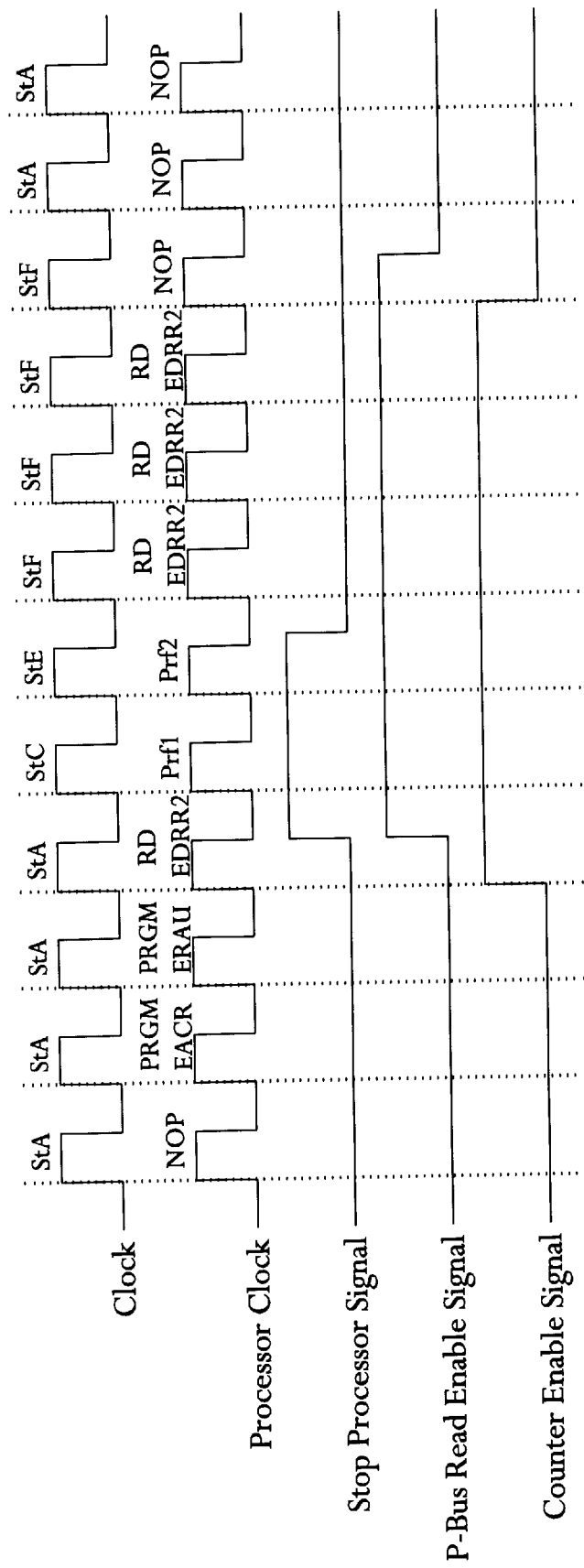
FIG. 11 presents the timing diagrams for the operation of one embodiment of a state machine output generator of the state machine block of FIG. 9, during a block read access through the private bus.
Figure 12:
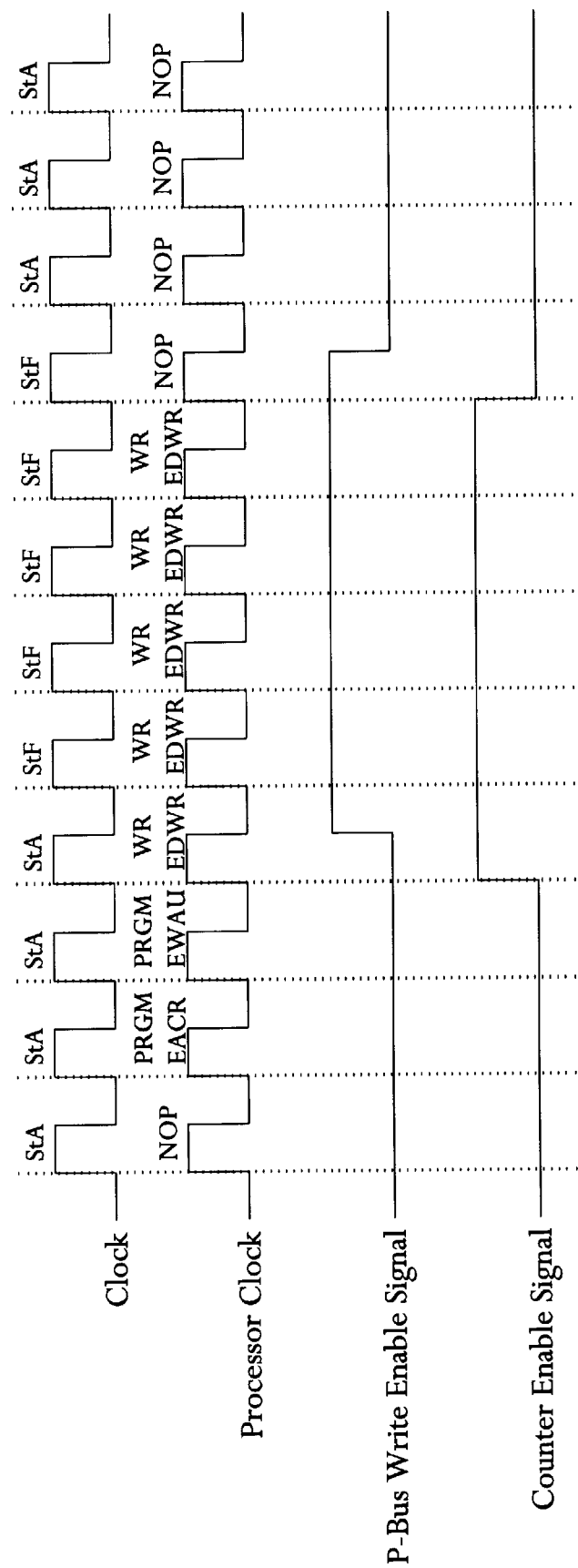
FIG. 12 presents the timing diagrams for the operation of one embodiment of the state machine output generator of the state machine block of FIG. 9, during a block write access through the private bus.
Figure 13:
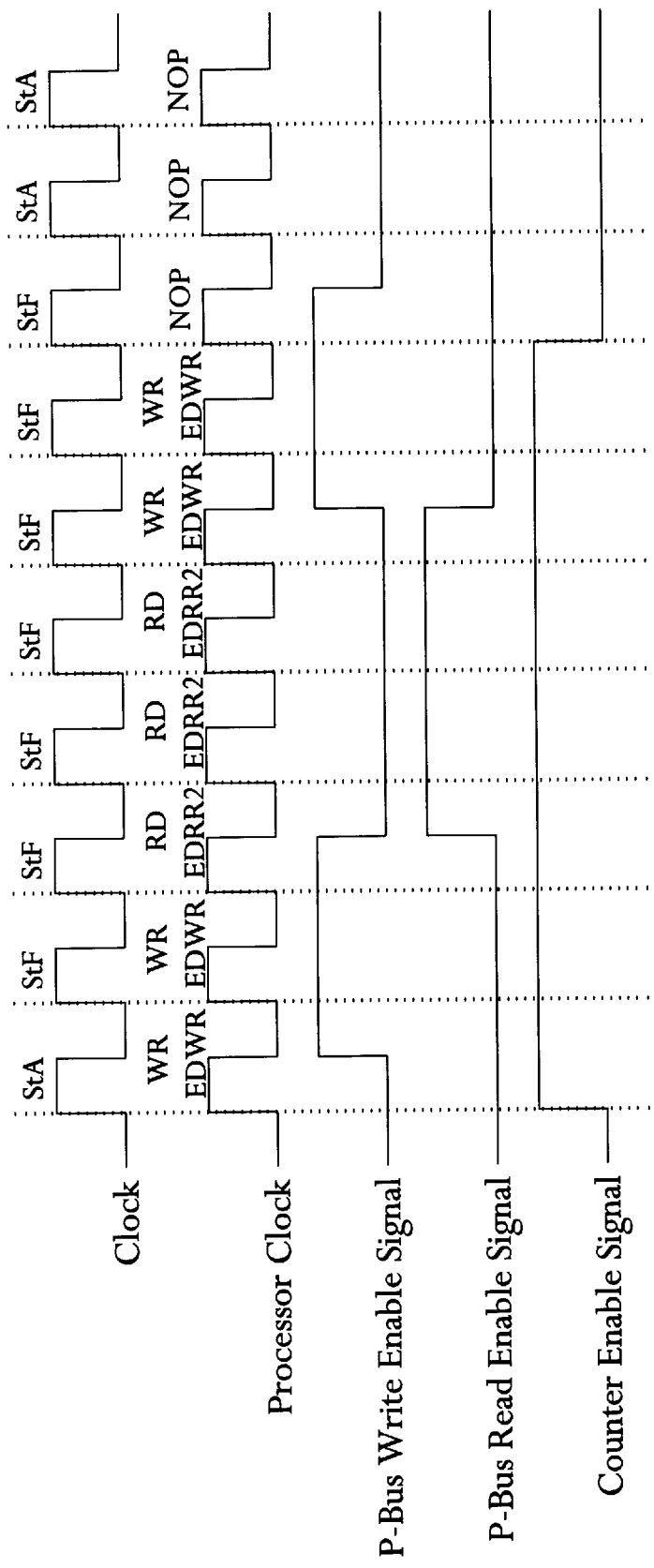
FIG. 13 presents the timing diagrams for the operation of one embodiment of the state machine output generator of the state machine block of FIG. 9, during a read after write access through the private bus.

The operation of private bus state machine 254 will now be described with reference to FIGS. 10–13. FIG. 10 presents the state diagram for one embodiment of private bus state machine 254 of FIG. 9. FIG. 11 presents the timing diagrams for the operation of one embodiment of state machine output generator 258 of state machine block 194 of FIG. 9, during a block read access through the private bus. FIG. 12 presents the timing diagrams for the operation of one embodiment of state machine output generator 258 of state machine block 194 of FIG. 9, during a block write access through the private bus. FIG. 13 presents the timing diagrams for the operation of one embodiment of state machine output generator 258 of state machine block 194 of FIG. 9, during a read after write access through the private bus.

As shown in FIG. 10, the operation of private bus state machine 254 is defined by the value of three signals, which are: (1) private bus access enable signal, (2) read with data in second EDRR 226*a* (i.e., EDRR2) not valid signal, and (3) the stop request signal. The private bus access enable signal is the private bus state machine enable signal generated by state machine control unit 250. More specifically, state machine control unit 250 generates an active private bus enable signal when processor 156 indicates (through signals on external input/output access bus 182, EMAU register bus 184, read/write bus 186, and the sixteenth bit of a second control word) an external read or write operation through external data registers 226*a* or 228 and through private bus 146.

In addition, an input forming logic of private bus state machine 254 also generates an active read with data in second EDRR 226*a* not valid signal, when the processor initiates a single access read operation. The input forming logic detects that the processor has initiated a single access read operation when the block mode signal is deactive and the processor requests an external read of EDRR 226*a*. Furthermore, the input forming logic of private bus state machine 254 also generates an active read with data in second EDRR 226a not valid signal, when the processor directs the EMAU to initiate an initial prefetch read of a block read operation. The input forming logic detects that the processor has directed the EMAU to initiate an initial read of a block read operation when the input forming logic detects a first request from processor 156 to read EDRR 226a after the processor writes the second control word into ERAU 224.

On the other hand, the input forming logic maintains an inactive read with data in second EDRR 226 not valid signal (i.e., this signal has a value of "0") when processor 156 has requested a write operation (i.e., has initiated communication with the external data write register 228). The input forming logic also maintains an inactive read with data in second EDRR 226a invalid signal, when processor 156 resumes a block read access after interrupting an initial block read access in mid-access.

As further shown in FIG. 10, private bus state machine 254 remains (i.e., loops) in idle State A as long as the stop request and private bus access enable signals are inactive. However, after sensing that processor 156 has initiated an external access and currently is accessing external data registers 226a or 228 (i.e., after generating an active P-bus access enable signal), private bus state machine 254 transitions to either State C or State F.

For example, the transition of private bus state machine 254 from State A to State C (which occurs if processor 156 requests a single access read or an initial read of a block read operation from second EDRR 226a) will now be described with reference to FIGS. 10, 11 and 13. As shown in these figures, if processor 156 requests an initial block read from second EDRR 226a while private bus state machine 254 is in idle State A, output generator 258 activates the counter enable signal for as long as the processor accesses the external data registers 226a or 228. In addition, during the low phase of this initial clock cycle, output generator 258 (1) asserts a stop processor signal on the stop processor clock line 188 and maintains this signal for two clock cycles, and (2) activates the enable read signal of the private bus and maintains this signal until one half clock cycles after the processor terminates its communication with second EDRR 226a.

At the rising edge of the next clock cycle, private bus state machine 254 senses that the private bus access enable signal and the read with data in EDRR2 invalid signal are active, and therefore transitions from State A to first prefetch State C. During the clock cycle that private bus state machine 254 remains in first prefetch State C, the output generator 258 maintains the private bus read enable signal in order to allow bus interface 190 to begin storing a first data word in first EDRR 226b. In the next clock cycle, private bus state machine 254 then transitions to second prefetch State E, during whose clock cycle output generator 258 deactivates the stop processor signal to allow processor 156 to begin to receive the data stored in second EDRR 226a.

In the next clock cycle, private bus state machine 254 transitions to access State F. In this state, processor is running, and state machine 254 monitors the signals on external input/output access bus 182, EMAU register bus 184, and read/write bus 186, in order to determine if the processor currently is requesting another external read/write operation through external data registers 226a or 228. If the current processor instruction is not an external access through external data registers 226a or 228 (i.e., private bus access enable signal is not active), the private bus state machine transitions to idle State A. For example, if the current processor instruction is program ERAU 224 or EWAU 230, the private bus state machine transitions from State F to State A because the private bus access enable signal is deactivated (as the processor no longer is accessing either EDRR 226a or EDWR 228).

On the other hand, if the current instruction is another access to second external data register 226a (i.e., another read access), private bus state machine 254 remains in State F and performs the read access. In addition, as shown in FIGS. 10 and 13, if the current instruction is an access to external data write register 228 (i.e., a write access), private bus state machine 254 remains in State F and performs the write operation based on the address in EWAU 230. Finally, state machine 254 transitions from State F to State C when both the private bus access enable signal and the read with data in EDRR2 invalid signal are active (e.g., when processor 156 requests an external read after previously interrupting a read operation prior to prefetching any data words but after programming ERAU 224).

The direct transition of private bus state machine 254 from State A to State F in one clock cycle (which occurs when processor 156 has requested an external write to EDWR 228 while state machine 254 is in State A or processor 156 resumes a block read access after interrupting a prior block read access) will now be described with reference to FIGS. 10, 12 and 13. As shown in these figures, if while state machine 254 idles in State A processor 156 requests an external write to EDWR 228, output generator 258 activates the counter enable signal for as long as the processor accesses the external data registers 226a or 228. In addition, during the low phase of this initial clock cycle, output generator 258 activates the private bus enable write signal and maintains this signal until one half clock cycles after the processor terminates its communication with EDWR 228.

In the next clock cycle, private bus state machine 254 senses that the private bus access enable signal is active (i.e., has a value of "1") while the read with data in EDRR2 invalid signal is inactive (i.e., has a value of "0"), and therefore transitions to access State F. In this state, state machine 254 monitors the signals on external input/output access bus 182, EMAU register bus 184, and read/write bus 186 in order to determine if the processor currently is requesting another external read or write operation through external data registers 226a or 228. If the current processor instruction is not an external access through external data registers 226a or 228 (i.e., private bus access enable signal is not active), the private bus state machine transitions to idle State A. On the other hand, if the current instruction is another access to external data write register 228 (i.e., another write operation), the private bus state machine 254 remains in State F and maintains generating the enable signals (i.e., counter enable signal and private bus write enable signal), which allow bus interface 190 to perform the write operation.

In addition, as shown in FIGS. 10 and 13, if the current instruction is an access to second external data read register 226a (i.e., a read access), private bus state machine 254 still maintains an active counter enable signal for as long as the processor accesses the external data registers 226a or 228. However, during the low phase of the clock cycle for the current instruction, output generator 258 deactivates the private bus enable write signal, while activating the enable read signal of the private bus and maintaining this signal until one half clock cycles after the processor terminates its communication with second EDRR 226a. The EMAU then in the next clock cycle initiates a read operation based on the address in ERAU 224. In this manner, the external accessing apparatus of the present invention can transition from a write to a read operation in just one clock cycle when the processor does not load a new address into ERAU 224.

The above discussion of the state transitions of state machine 254 assumes that the stop request signal is inactive (i.e., has a value of "0"). If this stop request signal becomes active while state machine 254 is in idle State A or access State F, the state machine 254 transitions to stop State H on the rising edge of the next clock cycle. State machine 254 remains in State H until the clock module removes the stop request signal, before transitioning to either State G or State C in the following clock cycle. State machine 254 transitions to State C, if the stop request signal becomes inactive and processor 156 requests an initial external read from second EDRR 226a (i.e., if the P-bus access enable signal and the read with data in EDRR2 invalid signal are active while the stop request signal is inactive).

On the other hand, if processor 156 does not request an initial external read from second EDRR 226a, state machine 254 transitions from State H to State G during the next clock cycle. From State G (which is a start processor after a global stop state), state machine 254 then transitions to either idle State A or access State F. More specifically, state machine 254 transitions from State G to State F if the private bus enable signal is active while the read with data in EDRR 226a invalid is inactive. On the other hand, state machine 254 transitions from State G to State A if the private bus enable signal is inactive.

The operation of private bus state machine 254 after the processor interrupts an external access will now described. If the processor has to interrupt an external block read operation, but wishes to later resume this operation, the processor first has to store the address of the data contained in second external data read register 226a. If during the interrupt the processor uses external data read registers for alternative read operations, the processor has to reprogram the stored address of the original data in EDRR 226a into external read address unit 224 before resuming its original block read operation. On the other hand, if during the interrupt the processor does not perform other read operations, the processor can later resume its original block read operation by simply reaccessing EDRR 226a without any further programming of ERAU 224.

On the other hand, if the processor has to interrupt an external block write operation in mid-access, in order to later resume its external block write operation the processor first has to store the address stored in EWAU 230. After the interrupt, the processor has to reload the stored original value of the EWAU back into this address unit, if during the interrupt the processor performed alternative external write operations. On the other hand, if during the interrupt the processor did not perform alternative write operations, after the interrupt the processor can simply resume its block write access by accessing EDWR 228.

Finally, it should be noted that private bus state machine 254 is designed in such a manner so as to allow processor 156 to repeatedly perform the same single access read operation without the delay due to the two prefetch cycles. More specifically, whenever processor 156 requests a single access read operation by deactivating the block mode signal, the processor has to wait three clock cycles before receiving its requested data word. This delay remains unchanged even in those situations where the processor has requested in subsequent clock cycles that the same data word be supplied to it because, whenever the processor requests a single read operation by deactivating the block mode signal, the processor causes private bus state machine 254 to transition from State A to prefetch States C and E. However, the processor can also repeatedly access the same data word (i.e., can repeatedly perform the same single read operation) by indicating a block read operation with a loop size of one, which in turn allows the processor to access EDRR 226a to obtain the data word after one and only one two clock cycle prefetch stage.

b. Shared Bus State Machine

If processor 156 indicates (through the sixteenth bit of the second control word) that it wishes to initiate an external access through shared bus 148 and indicates (on the EMAU register bus) that it wishes to access external data registers 226a or 228, state machine block control unit 250 enables shared bus state machine 252 while disabling private bus state machine 254.

Figure 14:
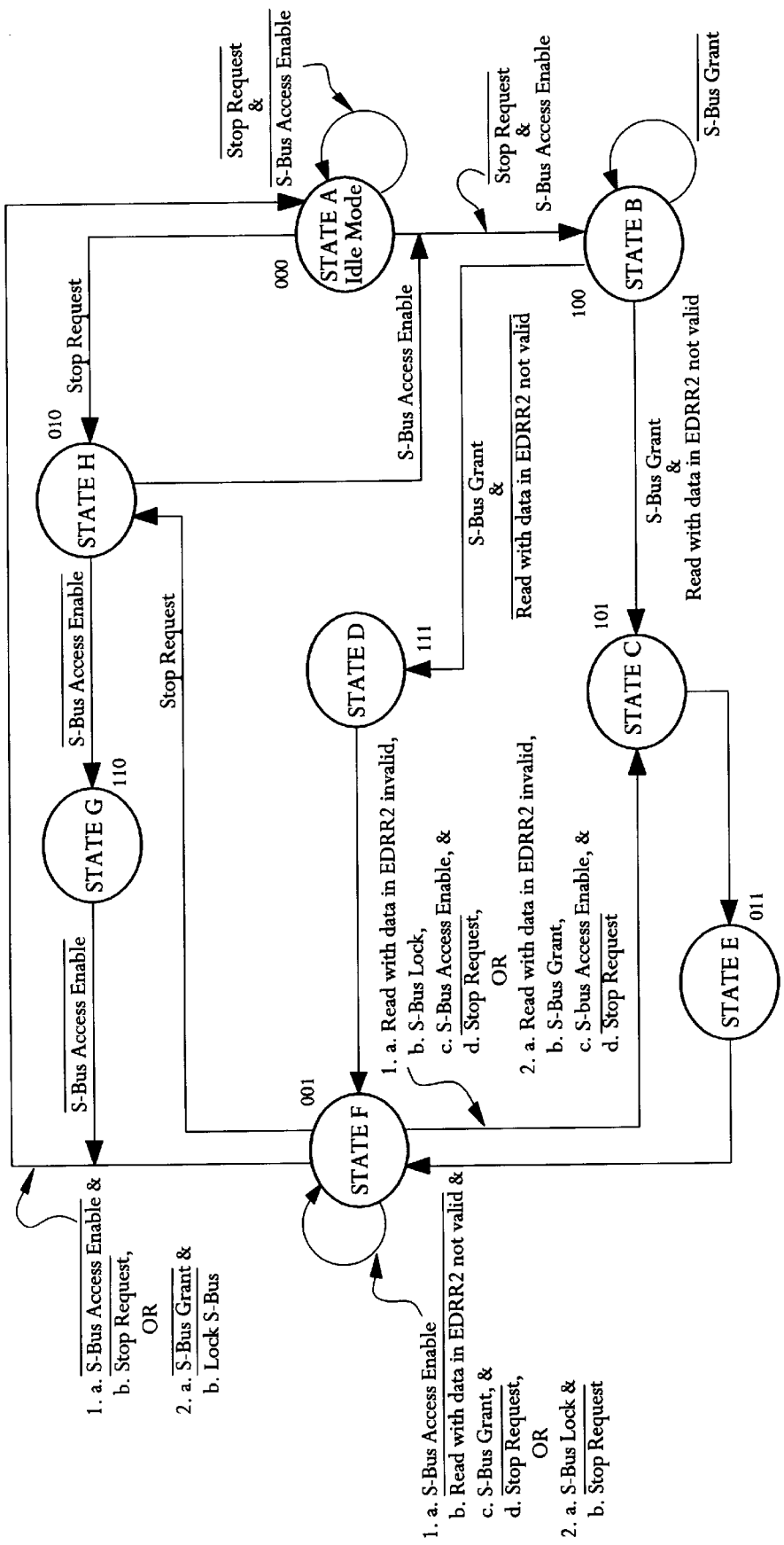
FIG. 14 presents one embodiment of a state diagram for a shared bus state machine of the state machine block of FIG. 9.
Figure 15:
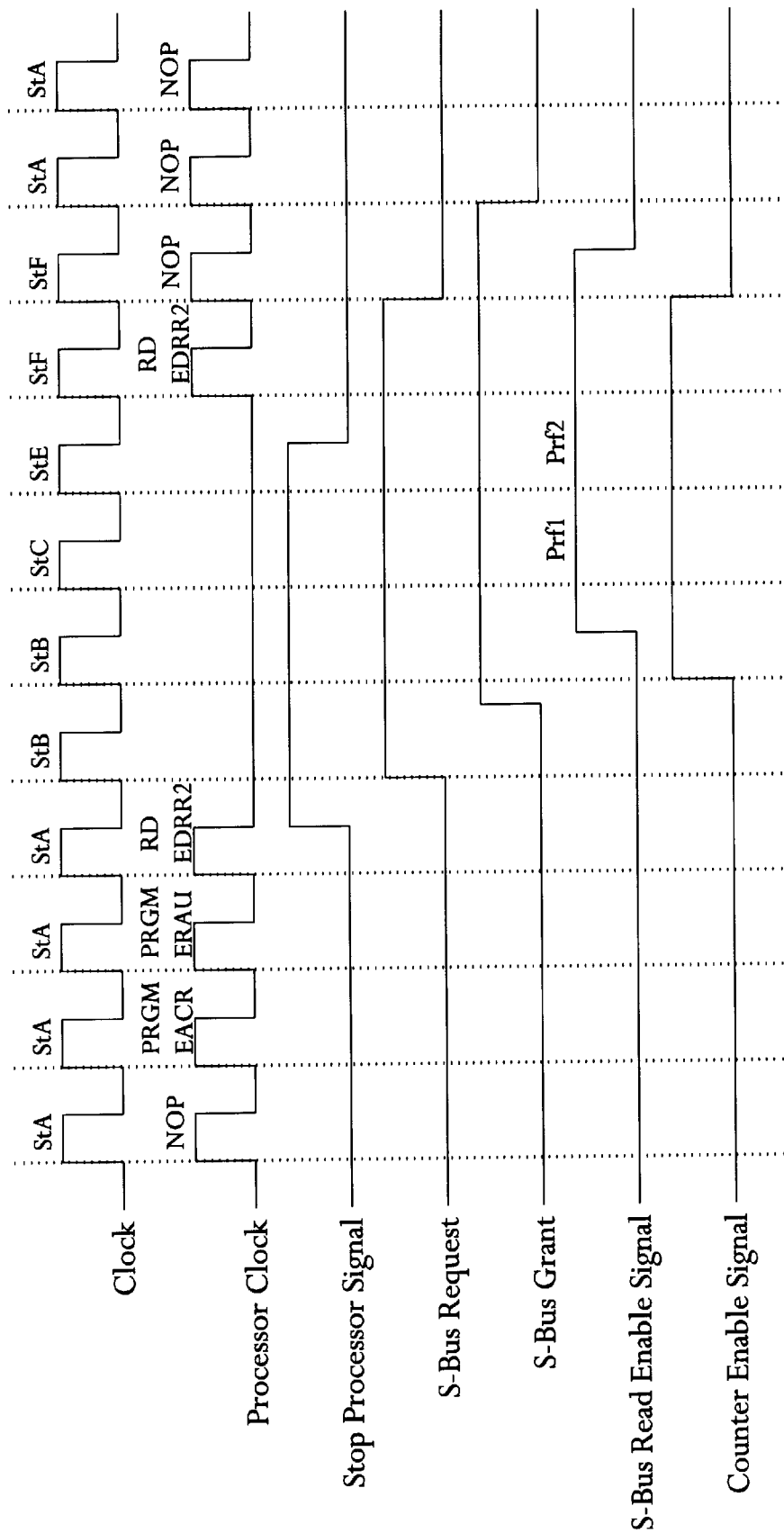
FIG. 15 presents the timing diagrams for the operation of one embodiment of the state machine output generator unit of the state machine block of FIG. 9, during a block read access through the shared bus.
Figure 16:
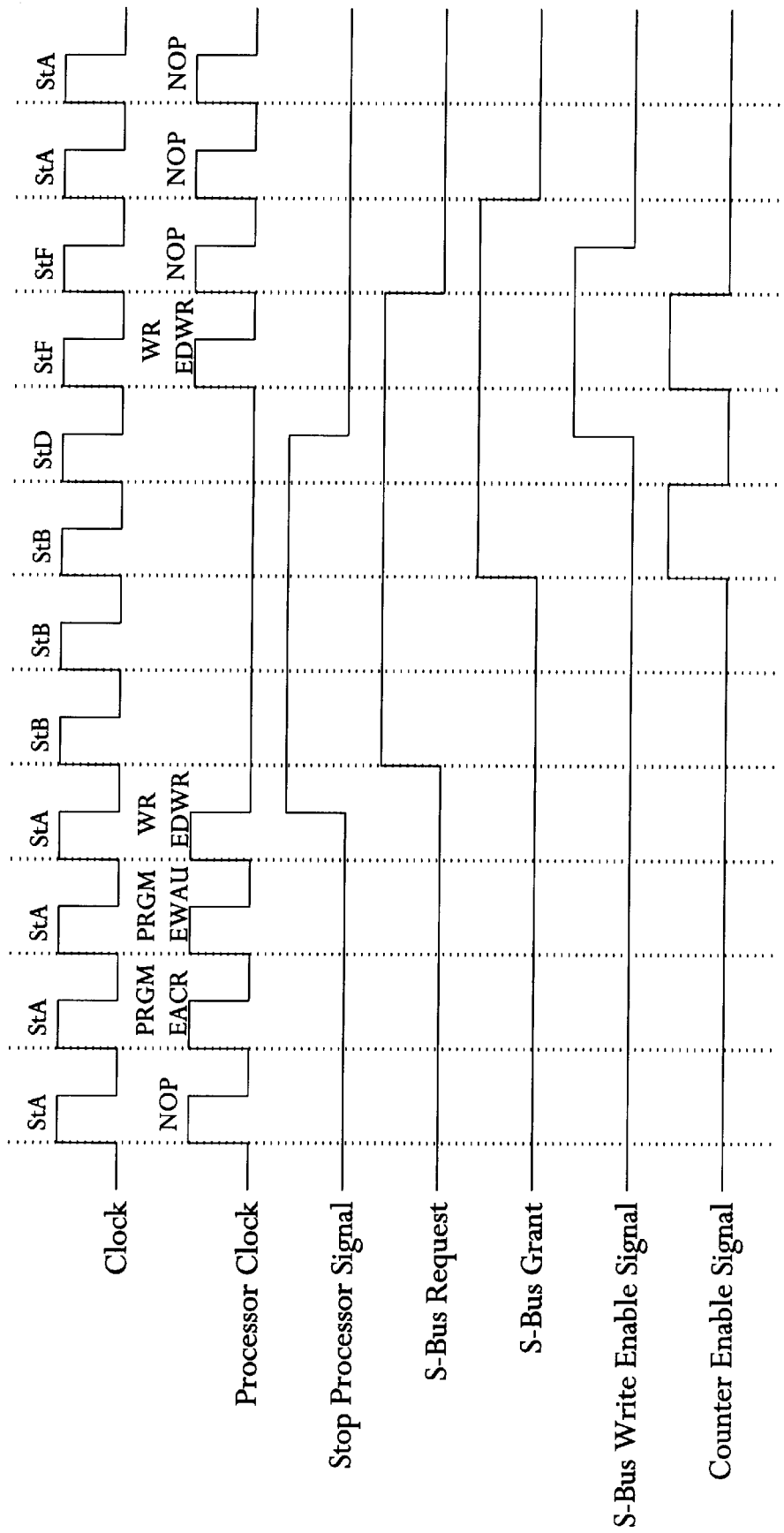
FIG. 16 presents the timing diagrams for the operation of one embodiment of the state machine output generator unit of the state machine block of FIG. 9, during a block write access through the shared bus.
Figure 17:
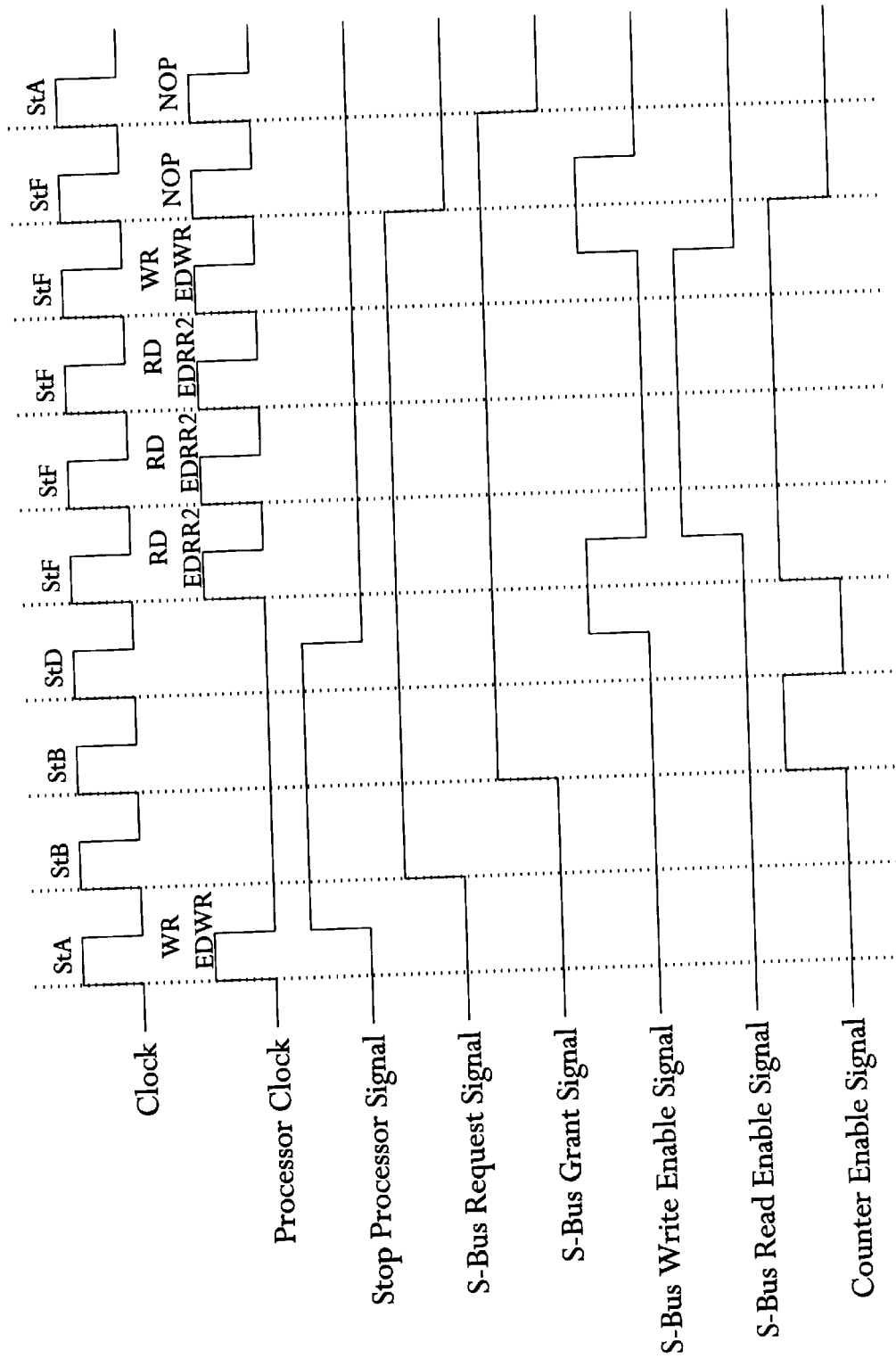
FIG. 17 presents the timing diagrams for the operation of one embodiment of the state machine output generator unit of the state machine block of FIG. 9, during a read after write access through the shared bus.
Figure 18:
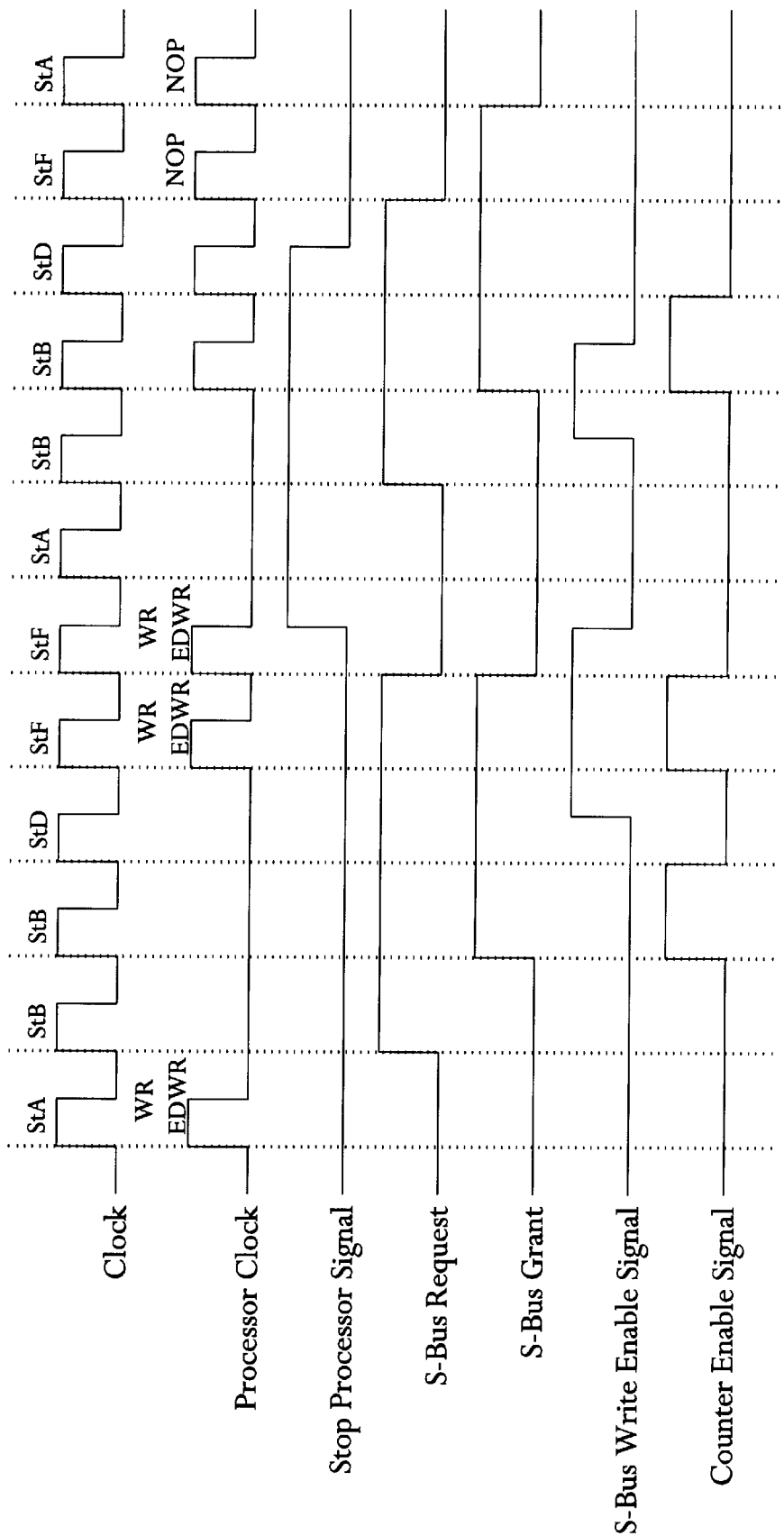
FIG. 18 presents the timing diagrams for the operation of one embodiment of the state machine output generator unit of the state machine block of FIG. 9, during a write access through the shared bus when the shared bus grant signal is removed and the processor has not locked the shared bus.

The operation of shared bus state machine 252 will now be described with reference to FIGS. 14–18. FIG. 14 presents the state diagram for one embodiment of shared bus state machine 252 of FIG. 9. FIG. 15 presents the timing diagrams for the operation of one embodiment of state machine output generator 258 of state machine block 194 of FIG. 9, during a block read access through the shared bus. FIG. 16 presents the timing diagrams for the operation of one embodiment of state machine output generator 258 of state machine block 194 of FIG. 9, during a block write access through the shared bus. FIG. 17 presents the timing diagrams for the operation of one embodiment of state machine output generator 258 of state machine block 194 of FIG. 9, during a read after sprite access through the shared bus. FIG. 18 presents the timing diagrams for the operation of one embodiment of state machine output generator 258 of state machine block 194 of FIG. 9, during a write access through the shared bus when the shared bus grant signal is removed and the processor has not locked the shares bus.

As shown in FIG. 14, the operation of shared bus state machine 252 is defined by the value of five signals, which are: (1) the shared bus access enable signal, (2) the read with data in EDRR2 226a not valid signal, (3) the stop request signal, (4) the shared bus grant signal, and (5) the lock shared bus signal. The shared bus access enable signal is the shared bus state machine enable signal generated by state machine control unit 250. More specifically, control unit 250 generates an active access enable signal when processor 156 indicates (through signals on external input/output access bus 182, EMAU register bus 184, read/write bus 186, and the sixteenth bit of the second control word) an external read or write operation through external data registers 226a or 228 and through shared bus 148.

In addition, an input forming logic of shared bus state machine 252 also generates an active read with data in second EDRR 226a not valid signal, when the processor initiates a single access read operation. The input forming logic detects that the processor has initiated a single access read operation when the block mode signal is deactive and the processor requests an external read of EDRR 226a. Furthermore, the input forming logic of the shared bus state machine 252 also generates an active read with data in second EDRR 226a not valid signal, when the processor directs the EMAU to initiate an initial prefetch read of a block read operation. The input forming logic detects that the processor has directed the EMAU to initiate an initial read of a block read operation when the input forming logic detects a first request from processor 156 to read EDRR 226a after the processor has previously written the second control word into ERAU 224.

On the other hand, the input forming logic maintains an inactive read with data in second EDRR 226a not valid signal when processor 156 has requested a write operation (i.e., has initiated communication with the external data write register 228). The input forming logic also maintains an inactive read with data in second EDRR 226a invalid signal, when processor 156 resumes a block read access after interrupting an initial block read access in mid-access.

As further shown in FIG. 141, shared bus state machine 252 remains (i.e., loops) in idle State A as long as the stop request and shared bus access enable signals are inactive. However, after sensing that processor 156 has initiated an external access and currently is accessing external data registers 226a or 228 (i.e., after generating an active S-bus access enable signal), output generator 258 stops the processor clock. More specifically, when output generator 258 senses that processor 156 has requested an initial external access and currently is accessing external data registers 226a or 228 while shared bus state machine 252 is in idle State A, output generator 258 activates a stop processor signal on the stop processor line 188 during the low phase of this initial sensing clock cycle.

At the rising edge of the next clock cycle, shared bus state machine 252 transitions to request State B and activates its shared bus request signal (which it supplies to arbiter 150 in order to obtain permission to access the shared bus). The shared bus state machine then remains (i.e., loops) in this state until arbiter 150 grants access to the shared to the EMAU. After the arbiter grants the EMAU's shared bus request (i.e., after shared bus state machine 252 receives an active shared bus grant signal), shared bus state machine 252 remains in State B for one more full clock cycle. During this final clock cycle in State B, output generator 258 activates the counter enable signal. At the rising edge of the clock cycle after this final State B clock cycle, state machine 252 transitions to either State C or State D based on the value of the read with data in second EDRR 226a invalid signal.

For example, the transition of shared state machine 252 from State B to State C (which occurs if processor 156 requests a single access read or an initial external read from second EDRR 226a) will now be described with reference to FIGS. 14, 15 and 17. As shown in these figures, if processor 156 requests an initial block read from second EDRR 226a, (1) output generator 258 activates the shared bus read enable signal, during the low phase of the final State B clock cycle, and (2) shared bus state machine 252 transitions from request State B to first prefetch State C, at the rising edge of the clock cycle after this final State B clock cycle. During the clock cycle that shared bus state machine 252 remains in first prefetch State C, the output generator 258 maintains the shared bus read enable signal in order to allow bus interface 190 to begin storing a first data word in first EDRR 226b.

In the next clock cycle, shared bus state machine 252 then transitions to second prefetch State E, during whose clock cycle output generator 258 deactivates the stop processor signal to allow processor 156 to begin to receive the data stored in second EDRR 226a. During the subsequent clock cycle, shared bus state machine 252 moves to access State F. In this state, the processor is running, and state machine 252 monitors the signals on external input/output access bus 182, EMAU register bus 184, and read/write bus 186, in order to determine if the processor currently is requesting another external read/write operation through external data registers 226a or 228. If the current processor instruction is not an external access through external data registers 226a or 228 (i.e., shared bus access enable signal is not active), the shared bus state machine transitions to idle State A. For example, when the current processor instruction is program ERAU 224 or EWAU 230, the shared bus state machine transitions for State F to State A because the shared bus access enable signal is deactivated (as the processor no longer is accessing either EDRR 226a or EDWR 228).

On the other hand, if the current instruction is another access to second external data register 226a (i.e., another read access), shared bus state machine 252 remains in State F and performs the read access. In addition, as shown in FIGS. 14 and 17, if the current instruction is an access to external data write register 228 (i.e., a write access), shared bus state machine 252 remains in State F and performs the write access based on the address in EWAU 230.

The transition of shared bus state machine 252 from State B to State D (which occurs when processor 156 has requested an external write to EDWR 228 while state machine 252 is in State A or processor 156 resumes a block read access after interrupting a prior block read access) will now be described by reference to FIGS. 14, 16 and 17. As shown in these figures, if (while state machine 252 idles in State A) processor 156 requests an external write to EDWR 228, shared bus state machine 252 transitions from request State B to start State D, at the rising edge of the clock cycle after this final State B clock cycle. During the low phase of the clock cycle that shared bus state machine 252 remains in start State D, output generator 258 (1) activates a shared bus write enable signal and maintains this signal active until one-half clock cycles after the processor terminates its communication with EDWR 228, and (2) starts the processor clock by deactivating the stop processor signal. In addition, during the clock cycle that shared bus state machine 252 remains in start State D, output generator 258 deactivates the counter enable signal.

In the next clock cycle, shared bus state machine 252 transitions to State F and output generator 258 reactivates the counter enable signal and maintains this signal active until the processor stops communicating with EDWR 228. In this state, state machine 252 monitors the signals on external input/output access bus 182, EMAU register bus 184, and read/write bus 186 in order to determine if the processor currently is requesting another external read or write operation though external data registers 226a or 228. If the current processor instruction is not an external access through external data registers 226a or 228 (i.e., shared bus access enable signal is not active), the shared bus state machine transitions to idle State A. On the other hand, if the current instruction is another access to external data write register 228 (i.e., another write operation), shared bus state machine 252 remains in State F and maintains generating the enable signals (i.e., counter enable signal and shared bus write enable signal) which allow bus interface 190 to perform the write operation.

In addition, as shown in FIGS. 14 and 17, if the current instruction is an access to second external data read register 226a (i.e., a read access), shared bus state machine 252 still maintains an active counter enable signal for as long as the processor accesses the external data registers 226a or 228. However, during the low phase of the clock cycle for the current instruction, output generator 258 deactivates the shared bus enable write signal while activating the enable read signal of the shared bus and maintaining this signal until one half clock cycles after the processor terminates its communication with second EDRR 226a. The EMAU then in the next clock cycle initiates a read operation based on the address in ERAU 224. In this manner, the external accessing apparatus of the present invention can transition from a write to a read operation in just one clock cycle when the processor does not Load a new address into ERAU 224.

The operation of shared bus state machine 252 when the processor interrupts a block operation is similar to the operation of private bus state machine 254 during such interrupts. In addition, the above discussion of the state transitions of state machine 252 assumes (1) that the stop request signal is inactive, and (2) that the arbiter does not remove its grant signal to the EMAU in middle of an external access. As these two assumptions are not always accurate, a description of the operation of the state machine 252 is necessary when either the stop request signal is active or the arbiter removes its grant signal in middle of an external access. If the stop request signal becomes active while state machine 252 is in idle State A or access State F, state machine 252 transitions to stop State H on the rising edge of the next clock cycle. State machine 252 remains in State H until the clock module removes the stop request signal before transitioning to either State G or State B in the following clock cycle. State machine 252 transitions to State B, if the stop request signal becomes inactive while the shared bus access enable signal is active. On the other hand, if the shared bus access enable signal is active, state machine 252 transitions from State H to State G when the stop request signal is removed. From State G, state machine 252 then transitions to idle State A on the rising edge of the next clock cycle.

FIG. 18 presents the timing diagrams for the operation of one embodiment of output generator 258, during a write access through the shared bus when the shared bus grant signal is removed and the processor has not locked the shared bus. As shown in this figure, if the arbiter removes its shared bus grant signal while shared bus state machine is in access State F and processor 156 is requesting an external access, shared bus state machine 252 stops the processor clock, pulls its shared bus request low, and transitions to idle State A and then request State B. Once the arbiter returns the EMAU's shared bus grant signal, shared bus state machine then transitions from State B to either State C or D, based on the criteria discussed above.

It should be noted that if shared bus 148 is locked (i.e., if the twelfth bit of the first control word and the sixteenth bit of the second control word are set) and EMAU has started a shared bus access, shared bus state machine 252 will not pull its request low (i.e., shared bus state machine 252 will remain in State F or will transition to State C then State E), even if the shared bus grant is taken away. Shared bus state machine 252 will only pull its request low if the processor clears; this twelfth bit. Thus, by placing state machine 252 in State F and locking the shared bus, processor 156 can later initiate (1) an external write operation without seeking the arbiter's permission, or (2) an external read operation without seeking the arbiter's permission (this operation is shown as a transition from State F to State C in FIG. 14).

Consequently, external memory access apparatus 140 of the present invention reduces the data access time of processor for several reasons. First, by separating the program memory and the data memory, the data access time of processor 156 is not affected by the communications between processor 156 and program memory 160. Second, as data words are prefetched for the processor during read operation, the processor does not have to wait idly by until the data memory bank can supply a data word to it, but rather can have the EMAU fetch a subsequent data word while it decodes and executes a previous data word. Third, since the EMAU is not forced to drive a highly capacitive bus to access the data memory banks, the access time is reduced. Fourth, the data access time is also minimized because processor 156 does not have to terminate its data access to allow other components of the computer system to access the data banks, but rather can access a data bank through the private bus while allowing another component to access another data bank through the shared bus.

Finally, the external memory accessing apparatus of the present invention is advantageous because it requires a minimal amount of memory capacity as it allows the processor to access a particular data bank through the private bus while having DMA 152 refresh another memory bank through the shared bus.

I claim:

1. An external component access apparatus for enabling a processor to access a first external component, said external component access apparatus comprising:

(a) an external component access unit;

(b) an external component access unit bus for coupling said external component access unit to said processor;

(c) a bidirectional private bus for coupling said external component access unit to said first external component; and (d) a bidirectional shared bus for coupling said external component access unit to said first external component and for coupling a second external component to said first external component;

(e) wherein said processor instructs said external component access unit to access said first external component along one of said private bus and said shared bus; wherein said processor has sole access to said private bus to access said first external component; and further wherein said second external component is denied access to said first external component when said processor is accessing said first external component.

2. The external component access apparatus of claim 1, wherein said external component access unit transmits data to said first external component along one of said private bus and said shared bus when said processor requests said external component access unit to perform an external write operation to said first external component, and wherein said external component access unit receives data from said first external component along one of said private bus and said shared bus when said processor requests said external component access unit to perform an external read from said first external component.

3. The external component access apparatus of claim 1 further comprising a shared bus arbiter coupled to said shared bus, said shared bus arbiter allocating control of said shared bus among a plurality of bus masters coupled to said shared bus, wherein said external component access unit and said second external component are bus masters.

4. The external component access apparatus of claim 3, wherein, before said shared bus arbiter allocates control of said shared bus to a bus master requesting access to said shared bus, said shared bus arbiter determines whether another bus master is accessing the shared bus and if so then determines whether said requesting bus master has a higher priority status than said accessing bus master, if said requesting bus master has a higher priority status than said accessing bus master said shared bus arbiter causes said accessing bus master to terminate its access to said shared bus.

5. The external component access apparatus of claim 1 further comprising an external component controller coupled to said shared bus and to said first external component, wherein prior to communicating to said first external component said external component accessing unit and said second external component access said external component controller to request said external component controller to allocate said first external component to one of said private bus and said shared bus.

6. The external component access apparatus of claim 5 further comprising a third external component coupled to said private bus and said shared bus, wherein said external component access unit communicates to said third external component through one of said private bus and said shared bus while said second external component communicates to said third external component through said shared bus.

7. The external component access apparatus of claim 6, wherein said external component access unit communicates to said first external component through said private bus and said second external component communicates to said third external component through said shared bus.

8. The external component access apparatus of claim 1, wherein said second external component is a direct memory access unit that couples a plurality of external components to said first external component through said shared bus.

9. The external component access apparatus of claim 2, wherein, prior to requesting said external component access unit to initiate one of an external read operation and an external write operation, said processor programs said external component access unit.

10. The external component access apparatus of claim 9, wherein to program said external component access unit said processor (i) informs said external component access unit to conduct the external access through one of said shared bus and said private bus and (ii) supplies to said external component access unit an initial address in said first external component.

11. The external component access apparatus of claim 10, wherein said processor further programs said external component access unit by informing said external component access unit that the external access will be one of a single access operation and a block access operation.

12. The external component access apparatus of claim 4, wherein prior to requesting said external component access unit to initiate an external read or write operation, said processor programs said external component access unit to disregard said shared bus arbiter's request to terminate said external component access unit's access through said shared bus.

13. The external component access apparatus of claim 2, wherein said external component access unit starts an external read operation by halting the operation of said processor in order to prefetch data from said first external component.

14. The external component access apparatus of claim 9, wherein
   (a) if said processor accesses said first external component through said external component access unit and said private bus, said external component access apparatus enables said processor to access X locations in said first external component in X+Y clock cycles when said external component access unit performs a write operation and X+Y+Z clock cycles when said external component access unit performs a read operation; and
   (b) if said processor accesses said first external component through said external component access unit and said shared bus, said external component access apparatus enables said processor to access X locations in said first external component in X+Y+W clock cycles when said external component access unit performs a write operation and X+Y+Z+W clock cycles when said external component access unit performs a read operation;
   (c) wherein Y represents the number of clock cycles needed to program said external component access unit, Z represents the number of clock cycles needed to pre-fetch data for the read operation, and W represents the number of clock cycles that said external component access unit awaits until said shared bus arbiter grants said external component access unit access to said shared bus.

15. The external component access apparatus of claim 14, wherein said external component access unit includes:
   (a) a shared and private bus interface coupled to said external component access unit bus, to said shared bus, and to said private bus, wherein said processor programs said external component access unit by supplying programming data to said shared and private bus interface along said external component access unit bus, wherein after receiving an external access request from said processor said shared and private bus interface accesses said first external component through one of said private bus and said shared bus; and
   (b) a state machine block coupled to said external component access unit bus and to said shared and private bus interface, said state machine block controlling the operation of said shared and private bus interface during an external access operation by supplying enable signals to said shared and private bus interface, said state machine block generating said enable signals in response to signals that said processor supplies to said shared and private bus interface and to signals that said shared and private bus interface supplies to said state machine block.

16. The external component access unit of claim 15 further comprising:
   (a) a shared and private bus interface for coupling to said processor to receive programming and external access instructions from said processor, said programming and external access instructions for instructing said shared and private bus to access said first external component; and
   (b) a state machine block coupled to said shared and private bus interface, said state machine block for coupling to said processor and for controlling the operation of said shared and private bus interface during an external access operation by generating enable signals in response to signals that said processor supplies to said shared and private bus interface and to signals that said shared and private bus interface supplies to said state machine block.

17. The external component access unit of claim 16, wherein said shared and private bus interface includes a plurality of prefetch registers for storing prefetched data, said shared and private bus interface prefetching data when said processor requests an initial external read operation and said state machine block halts the operation of said processor.

18. A computer system comprising:
   (a) a program memory;
   (b) a processor coupled to said program memory through a program memory bus;
   (c) an external component access unit: coupled to said processor by an external component access unit bus;
   (d) a bidirectional private bus coupling said external component access unit to an external memory; and
   (e) a bidirectional shared bus coupling said external component access unit and an external component to said external memory;

(f) wherein said processor instructs said external component access unit to access said external memory along one of said private bus and said shared bus; and wherein said processor has sole access to said private bus to access said external memory; and further wherein said external component is denied access to said external memory when said processor is accessing said external memory.

* * * * *